United States Patent
Nagasaki

(10) Patent No.: US 9,386,170 B2
(45) Date of Patent: Jul. 5, 2016

(54) OPERATION PERFORMING SYSTEM CAPABLE OF GRASPING PERFORMANCE STATUS

(71) Applicant: BROTHER KOGYO KABUSHIKI KAISHA, Nagoya-shi, Aichi-ken (JP)

(72) Inventor: Takeshi Nagasaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/645,502

(22) Filed: Mar. 12, 2015

(65) Prior Publication Data
US 2015/0281475 A1  Oct. 1, 2015

(30) Foreign Application Priority Data
Mar. 31, 2014  (JP) .................. 2014-073760

(51) Int. Cl.
 G06F 3/12 (2006.01)
 H04N 1/00 (2006.01)
 H04N 1/32 (2006.01)
(52) U.S. Cl.
 CPC .......... *H04N 1/00244* (2013.01); *G06F 3/1207* (2013.01); *G06F 3/1259* (2013.01); *G06F 3/1287* (2013.01); *G06F 3/1288* (2013.01); *H04N 1/00228* (2013.01); *H04N 1/32037* (2013.01); *H04N 1/32566* (2013.01)
(58) Field of Classification Search
 None
 See application file for complete search history.

(56) References Cited

U.S. PATENT DOCUMENTS

| 2013/0148155 A1* | 6/2013 | Kitagata | G06F 3/1294 358/1.15 |
| 2014/0268236 A1* | 9/2014 | Ohara | G06F 3/1224 358/1.15 |
| 2015/0281500 A1* | 10/2015 | Mori | H04N 1/00928 358/1.15 |

FOREIGN PATENT DOCUMENTS

JP  2008-129642 A  6/2008

* cited by examiner

*Primary Examiner* — Miya J Cato
(74) *Attorney, Agent, or Firm* — Scully, Scott, Murphy & Presser, P.C.

(57) ABSTRACT

An operation performing system, comprising: a device; a service providing server for providing a service that causes the device to perform an operation; and a relay server for relaying between the service providing server and the device, wherein the device and the relay server are connected in a server-push enabled state, wherein the service providing server executes a first command-transmission processing for transmitting performance command for commanding performance of the operation, wherein the relay server executes a second command-transmission processing for transmitting, in the server-push enabled state, the performance command to the device, wherein the device executes a first status-transmission processing for transmitting, to the relay server, status information indicative of a status of the operation under performance, and wherein the relay server executes a second storage processing for storing in, the first storage, the status information in association with the service identifying information.

13 Claims, 10 Drawing Sheets

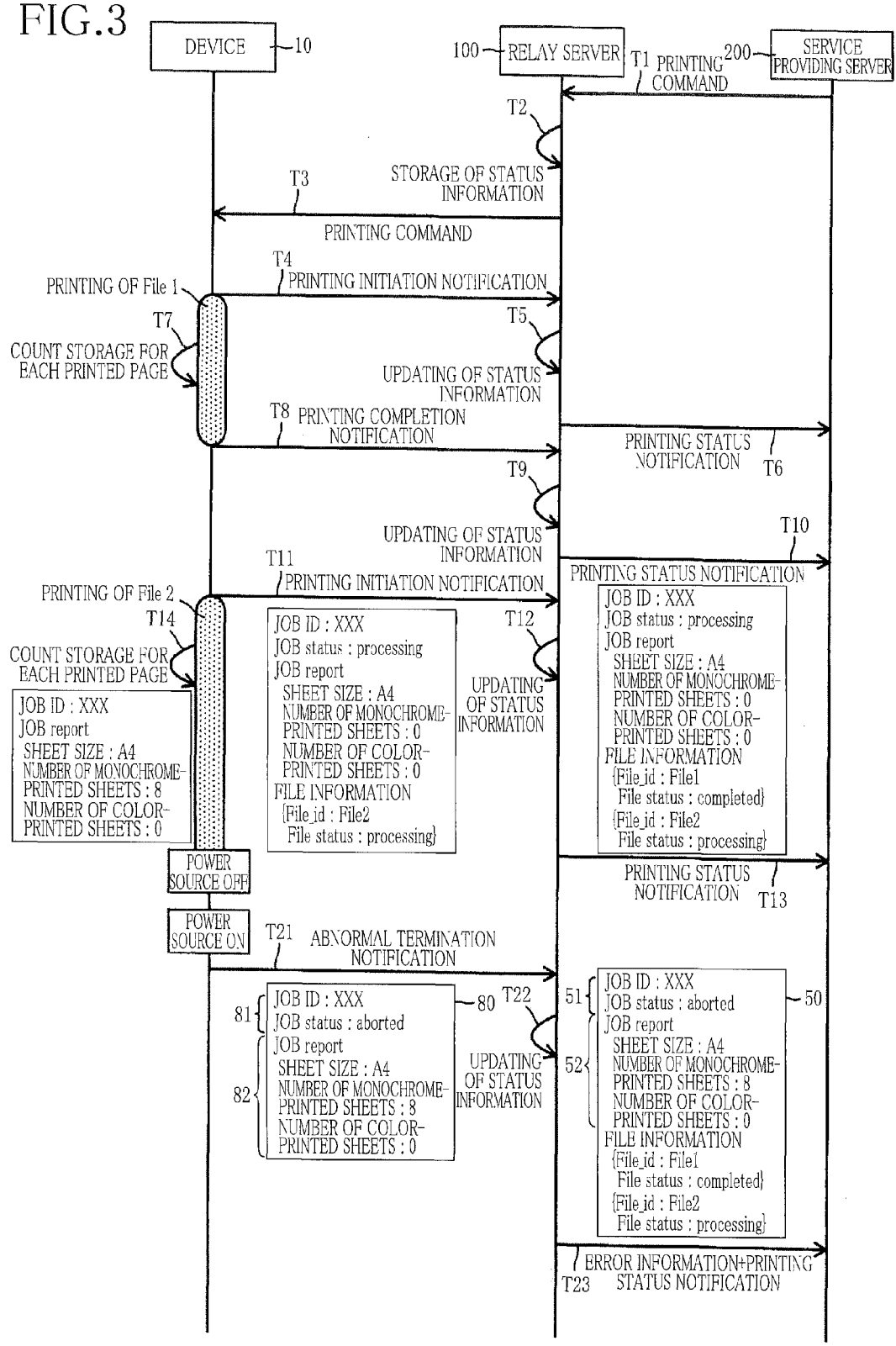

OPERATION PERFORMING SYSTEM CAPABLE OF GRASPING PERFORMANCE STATUS

CROSS REFERENCE TO RELATED APPLICATION

The present application claims priority from Japanese Patent Application No. 2014-073760, which was filed on Mar. 31, 2014, the disclosure of which is herein incorporated by reference in its entirety.

BACKGROUND OF THE INVENTION

1. Field of the Invention

The present invention relates to an operation performing system, a relay server, and a device.

2. Description of the Related Art

There is known a technique of transmitting a printing status of a printer to a display device that has transmitted printing data to the printer and displaying the printing status on the display device.

SUMMARY OF THE INVENTION

When a service providing server configured to provide a service that causes the device to perform a certain operation provides the service to the device, the service providing server needs to grasp how far the operation that is being performed by the device has proceeded. In a structure in which a relay server is interposed between the device and the service providing server, however, the service providing server cannot grasp how far the operation that is being performed has proceeded in a case where some abnormality occurs in the device or in communication between the device and the relay server during performance of the operation.

The present invention has been made to provide an operation performing system, a relay server, and a device which enable a service providing server to grasp a performing status of an operation that is being performed in the device, in a structure in which the relay server is interposed between the device and the service providing server.

The present invention provides an operation performing system, comprising: a device connected to the Internet via a router and capable of performing a certain operation; a service providing server on the Internet configured to provide a service that causes the device to perform the operation; and a relay server having a first storage and configured to relay between the service providing server and the device, wherein the device and the relay server are connected in a server-push enabled state in which the relay server transmits information generated on the Internet to the device via the router by use of a communication protocol and the device subsequently receives the information transmitted from the relay server, wherein the service providing server is configured to execute a first command-transmission processing for transmitting a performance command that commands performance of the certain operation and that includes specific information for identifying operation information representing the operation to be performed by the device, wherein the relay server is configured to execute a first reception processing for receiving the performance command transmitted from the service providing server, a second command-transmission processing for transmitting, in the server-push enabled state, the received performance command including the specific information to the device by use of the communication protocol, and a first storage processing for storing, in the first storage, service identifying information that identifies the service providing server, in response to reception of the performance command transmitted from the service providing server. The device is configured to execute processings comprising a second reception processing for receiving the performance command transmitted from the relay server in the server-push enabled state, an acquiring processing for acquiring the operation information identified by the specific information included in the received performance command, an operation performing processing for performing the operation referring to the acquired operation information, and a first status-transmission processing for transmitting, to the relay server, status information indicative of a status of the operation that is being performed in the operation performing processing, when timing to transmit the status information comes during performance of the operation. The relay server is configured to execute a third reception processing for receiving the status information transmitted from the device, a second storage processing for storing in, the first storage, the received status information in association with the service identifying information, and a second status-transmission processing for transmitting, to the service providing server that is associated with the status information, the status information stored in the first storage in the second storage processing and not yet transmitted to the service providing server.

It is noted that the present invention may be embodied in various modes, other than the operation performing system described above, such as an operation performing apparatus, a controller configured to control the operation performing apparatus, an operation performing method, a program for effectuating the operation performing system, and a storage medium storing the program. It is further noted that the relay server and the device that can be used in the operation performing system described above may be embodied in various modes such as a controller configured to control the relay server or the device and a program for effectuating the relay server or the device.

FORMS OF THE INVENTION

There will be described forms of the invention.

According to the operation performing system, the operation performing apparatus, the controller configured to control the operation performing apparatus, the operation performing method, the program for effectuating the operation performing system, the storage medium storing the program, and so on, when the performance command that commands the device to perform the certain operation is transmitted from the service providing server to the device, the relay server that has received the performance command transmits the performance command to the device while the relay server stores, in the first storage, the service identifying information that identifies the service providing server as a transmission source of the performance command. The device performs the operation referring to the operation information identified by the specific information included in the performance command, in response to reception of the performance command from the service providing server via the relay server. The device transmits, to the relay server, the status information indicative of the status of the operation that is being performed when timing to transmit the status information comes during performance of the operation in accordance with the performance command. The relay server stores, in the first storage, the status information transmitted from the device in association with the service identifying information.

Consequently, the relay server receives the status information of the operation and stores the status information in the first storage every time when the timing comes during performance of the operation by the device, thus making it possible to notify the service providing server of the progress of the operation that is being performed by the device at any time. In a case even where any abnormality occurs in the device or in communication between the device and the relay server during performance of the operation by the device, for instance, it is possible to notify the service providing server of the status of the operation before occurrence of the abnormality.

In the operation performing system, and so on, according to the present invention, the device may store, in the second storage, the status information indicative of the status that is being performed when timing to transmit the status information comes during performance of the operation in accordance with the performance command Where not-yet-transmitted status information is stored in the second storage, the device may transmit, to the relay server, notification information, together with the not-yet-transmitted status information, in response to switching of the power source of the device from on to off. Consequently, it is possible to notify the service providing server of the status of the operation before occurrence of the abnormality, via the relay server.

In the operation performing system, and so on, according to the present invention, in response to completion of performance of the operation with respect to one of a plurality of portions included in the operation information, the device may store, in the second storage, the status information indicative of the number of portions in the operation information with respect to which the operation has completed. Consequently, when the power source of the device is switched from off to on, it is possible to notify the service providing server of the number of portions included in the operation information with respect to which the operation has completed before turn-off of the power source.

In the operation performing system, and so on, according to the present invention, where the performance command includes a plurality of pieces of the specific information, the device may notify initiation and completion of the operation for the operation information identified by one of the plurality of pieces of the specific information, to the service providing server via the relay server. Also, the device may notify completion of the operation for all of the plurality of pieces of the operation information identified by the respective plurality of pieces of the specific information, to the service providing server via the relay server. Further, when the operation with respect to the one of the plurality of pieces of the operation information has completed and when the operations with respect to all of the plurality of the operation information have completed, the device may notify the number of portions included in the operation information with respect to which the operation has completed, to the service providing server via the relay server. Moreover, where the status information indicative of the number of portions with respect to which the operation has completed is stored in the second storage, the device may transmit, to the relay server, the notification information, in response to switching of the power source of the device from off to on. Consequently, it is possible to notify the service providing server via the relay server that the power source has been turned off during performance of the operation and how many portions included in the operation information have been subjected to the operation before turn-off of the power source.

In the operation performing system, and so on, according to the present invention, where the device performs the printing operation in accordance with the performance command transmitted from the service providing server, the device may store, in the second storage, the status information indicative of a cumulative sum of pages for which printing has completed every time when printing for one page completes. Further, where the status information indicative of the cumulative sum of pages for which printing has completed in the printing operation commanded by the performance command is stored in the second storage, the device may transmit, to the relay server, the notification, in response to switching of the power source from on to off. Consequently, it is possible to notify the service providing server via the relay server of turn-off of the power source during performance of the operation and the cumulative sum of pages for which printing has completed before turn-off of the power source.

In the operation performing system, and so on, according to the present invention, the performance command may include a plurality of pieces of the specific information for a plurality of pieces of the operation information and entirety identifying information that identifies an entirety of the operation commanded by the performance command. Among the performance commands received from the relay server, the device may store the entirety identifying information in the nonvolatile second storage and stores the specific information in the volatile third storage. Further, the device may store, in the second storage, the status information in accordance with the operation. The entirety identifying information and the status information are stored in the nonvolatile second storage. Consequently, even if the power source of the device has been once turned off and is subsequently turned on, the contents of the entirety identifying information and the status information before turn-off of the power source are maintained. It is thus possible to notify the service providing server via the relay server of the status of the operation before turn-off of the power source in an instance where the power source of the device has switched from off to on during performance of the operation. In this respect, the specific information is information that need not be transmitted when the power source is again turned on after having been turned off during performance of the operation. It is thus possible to reduce usage of the nonvolatile second storage by storing the specific information in the volatile third storage.

In the operation performing system, and so on, according to the present invention, where the operation is performed in settings different from those of the setting information included in the performance command that commands the operation, the device may store, in the second storage, the status information indicative of the status of the operation that is being performed, in association with the change information indicative of a setting change, every time when timing to store the status information in the second storage comes. It is thus possible to notify the service providing server via the relay server that the settings are changed from those in the operation initially performed in accordance with the setting information included in the performance command, together with the status information.

In the operation performing system, and so on, according to the present invention, the relay server may execute a successive transmission processing in which, every time when the status information is stored in the first storage, the stored status information is transmitted to the service providing server associated with the status information. Consequently, the service providing server can receive the status information at the same timing as timing at which the relay server stores the status information in the first storage.

In the operation performing system, and so on, according to the present invention, where a successive transmission is requested by the service providing server, the successive transmission processing may be executed by the relay server every time when the status information is stored in the first storage. Where the successive transmission is not requested by the service providing server, on the other hand, the status information need not be transmitted by the relay server even if the status information is stored in the first storage, and the status information stored in the first storage may be transmitted in response to a request by the service providing server. It is thus possible to transmit the status information to the service providing server in a suitable fashion.

In the operation performing system, and so on, according to the present invention, the relay server may designate, as a destination of the successive transmission, a destination that is identified by the destination identifying information included in the performance command. It is thus possible to transmit the status information to the destination requested by the service providing server.

In the operation performing system, and so on, according to the present invention, the device may transmit, to the relay server, the status information including information that can identify the service identifying information. Consequently, the relay server can transmit the status information received from the device to the service providing server as the transmission source of the performance command that commands the operation performed by the device.

In the operation performing system, and so on, according to the present invention, where a server-push disabled state continues for more than a predetermined time period between the device and the relay server after the performance command has been transmitted to the device according to a server-push technique, the relay server may transmit the status information indicative of an occurrence of an error to the service providing server as the transmission source of the performance command. It is thus possible to notify the service providing server of the occurrence of the error.

In the operation performing system, and so on, according to the present invention, where the server-push disabled state continues for more than the predetermined time period between the device and the relay server and the status information received from the device but not yet transmitted to the service providing server is stored in the first storage, the not-yet-transmitted status information and the status information indicative of the occurrence of the error may be transmitted. It is thus possible to notify the service providing server of the status information before the occurrence of the error.

In the operation performing system, and so on, according to the present invention, where the server-push disabled state continues for more than the predetermined time period between the device and the relay server due to turn-off of the power source of the device after the performance command has been transmitted to the device according to the server-push technique, the relay server may transmit, to the service providing server, the status information indicative of the occurrence of the error. It is thus possible to notify the service providing server of the occurrence of the error. Where the not-yet-transmitted status information is stored in the non-volatile second storage, the device may transmit, to the relay server, the notification information indicating that the power source of the device has been turned off during performance of the operation, together with the not-yet-transmitted status information, in response to switching of the power source of the device from off to on. Where the relay server receives the notification information transmitted from the device after the performance command has been transmitted to the device according to the server-push technique, the relay server may transmit the received notification information to the service providing server corresponding to the performance command. It is thus possible to notify the service providing server that the error has occurred due to turn-off of the power source of the device.

Here, definitions of "information" and "data" in claims and the specification will be explained. The term "information" is the superordinate of the term "data. Thus, "data. A" may be replaced with "information A". Even where "data" and "information" are changed in format (e.g., a text format, a binary format, and a flag format) for different computers, "data" and "information" are considered as the same data and information as long as the data and the information are recognized to have the same meaning or content. For instance, information indicative of "two" may be held as information in a text format expressed as "0x32" according to the ASCII code in one computer while it may be held as information in a binary format expressed as "10" according to the binary notation in another computer. It is noted, however, that "data" and "information" are not strictly distinguished from each other and may be exceptionally dealt with.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which:

FIG. 3 is a sequential diagram showing operations of the devices that constitute the operation performing system;

DETAILED DESCRIPTION OF THE EMBODIMENT

Figure 1:
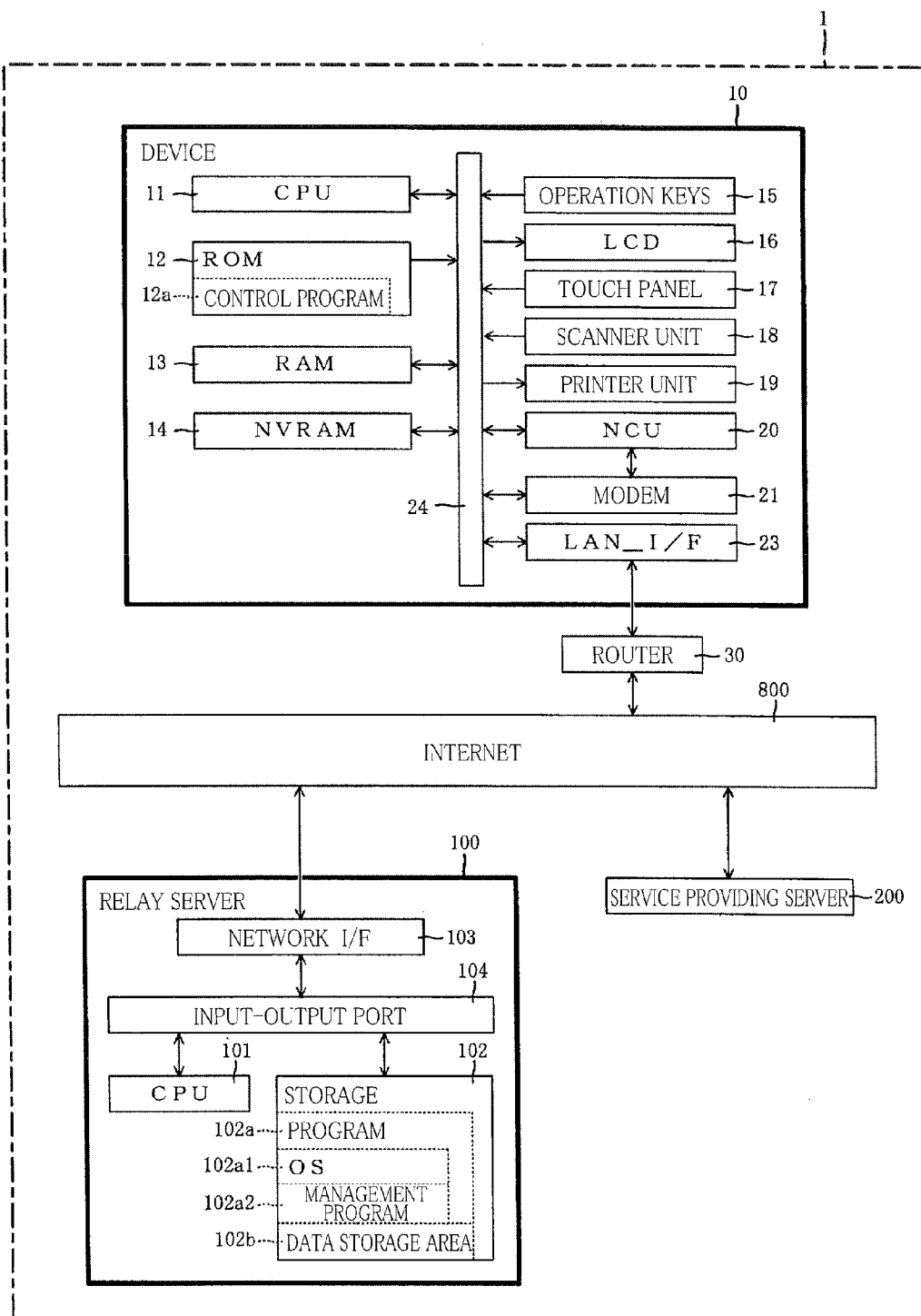
FIG. 1 is a block diagram showing an operation performing system according to one embodiment of the invention.

There will be explained one embodiment of the present invention with reference to the drawings. FIG. 1 is a block diagram of an operation performing system 1 according to one embodiment of the invention. The operation performing system 1 includes a device 10, a relay server 100, and a service providing server 200.

The device 10 according to the present embodiment is a multi-function peripheral (MFP) having various functions such as a printing function, a scanning function, a copying function, and a facsimile function. The service providing server 200 is a server configured to provide a service that causes the device 10 to perform a certain operation. In the present embodiment, the service providing server 200 causes the device 10 to perform a printing operation utilizing the printing function. The relay server 100 is a server configured to relay communication between the device 10 and the service providing server 200.

The relay server 100 of the present embodiment receives, from the device 10, information indicative of a performing status of an operation that has been initiated by the device 10 in response to a performance command of the operation from the service providing server 200, and the relay server 100 stores the received information. Hereinafter, the information indicative of the performing status of the operation is referred to as "status information" where appropriate. The relay server 100 transmits, to the service providing server 200, the status information that has been stored but not yet transmitted to the service providing server 200, at certain timing. Thus, the service providing server 200 can suitably grasp the performing status of the operation that is being performed by the device 10.

The device 10 is connected to the Internet 800 via a router 30. The relay server 100 and the service providing server 200 are also connected to the Internet 800. Communication between the device 10 and the relay server 100 is performed according to a connection establishment protocol, specifically, according to XMPP over BOSH (that is an abbreviation for Extensible Messaging and Presence Protocol Over Bidirectional-Streams Over Synchronous HTTP). In the XMPP over BOSH, the connection-established state is substantially always maintained. The XMPP over BOSH may be thus referred to as a continuous connection protocol, or a connection keeping protocol. Communication between the device 10 and the service providing server 200 is performed according to HTTP (that is an abbreviation for Hypertext Transfer Protocol).

As described above, the device 10 is connected to the Internet 800 via the router 30. The router 30 allows information transmitted from the device 10 to the Internet (800) side and a reply to the information to pass therethrough while the router 30 does not allow information transmitted from the Internet (800) side to the device 10, other than the reply, to pass therethrough. Consequently, the service providing server 200 cannot transmit information to the device 10.

Where the communication between the device 10 and the relay server 100 is performed according to the connection establishment protocol, the device 10 regularly transmits, to the relay server 100, information that requests connection establishment. The relay server 100 is only required to transmit information that should be transmitted to the device 10 by use of connection established by any of the information that requests connection establishment. When connection is being established, the router 30 allows information transmitted from the Internet (800) side to the device 10 to pass therethrough. Thus, server push is enabled in which the relay server 100 that is in a connection-established state with the device 10 according to the connection establishment protocol transmits, to the device 10 via the router 30, information generated on the Internet and the device 10 subsequently receives the information transmitted from the relay server 100. That is, server push includes a transmission processing for transmitting information generated on the Internet side from another device on the Internet side to the device connected to the Internet via the router, a relay processing in which the router relays the transmitted information, and a reception processing in which the device receives the relayed information. Server push does not include a processing in which a request that specifies information generated on the device side and to be received by the device is transmitted to another device on the Internet side via the router, and information whose kind is specified by the request is transmitted as a reply from another device on the Internet side to the device via the router. The server push is effectuated by connection utilizing the XMPP over BOSH as in the present embodiment. It is noted, however, that various configurations other than the configuration of the present embodiment are employable as long as the router can relay, to the device, information transmitted from another device on the Internet side and generated on the Internet side.

The communication according to the connection establishment protocol is established between the relay server 100 and the device 10. When a predetermined time-out period elapses after the establishment of the communication, a link of the established communication is disconnected. When the communication link according to the connection establishment protocol is disconnected, the router 30 does not pass the information transmitted from the relay server 100 to the device 10. That is, it becomes impossible to transmit information from the relay server 100 to the device 10. In view of this, the device 10 is configured to make a request for establishment of the communication to the relay server 100 in a fixed cycle shorter than the above-indicated time-out period, e.g., every one minute, after establishment of the communication, in order to maintain establishment of the communication according to the connection establishment protocol. The "fixed cycle" does not necessarily mean strictly the same cycle, but may allow a certain degree of variety.

The device 10 mainly includes a CPU 11, ROM 12, RAM 13, NVRAM 14, operation keys 15, an LCD 16, a touch panel 17, a scanner unit 18, a printer unit 19, an NCU 20, a modem 21, a LAN interface (hereinafter referred to as "LAN_I/F") 23. These are connected to one another via an input-output port 24.

Figure 6A:
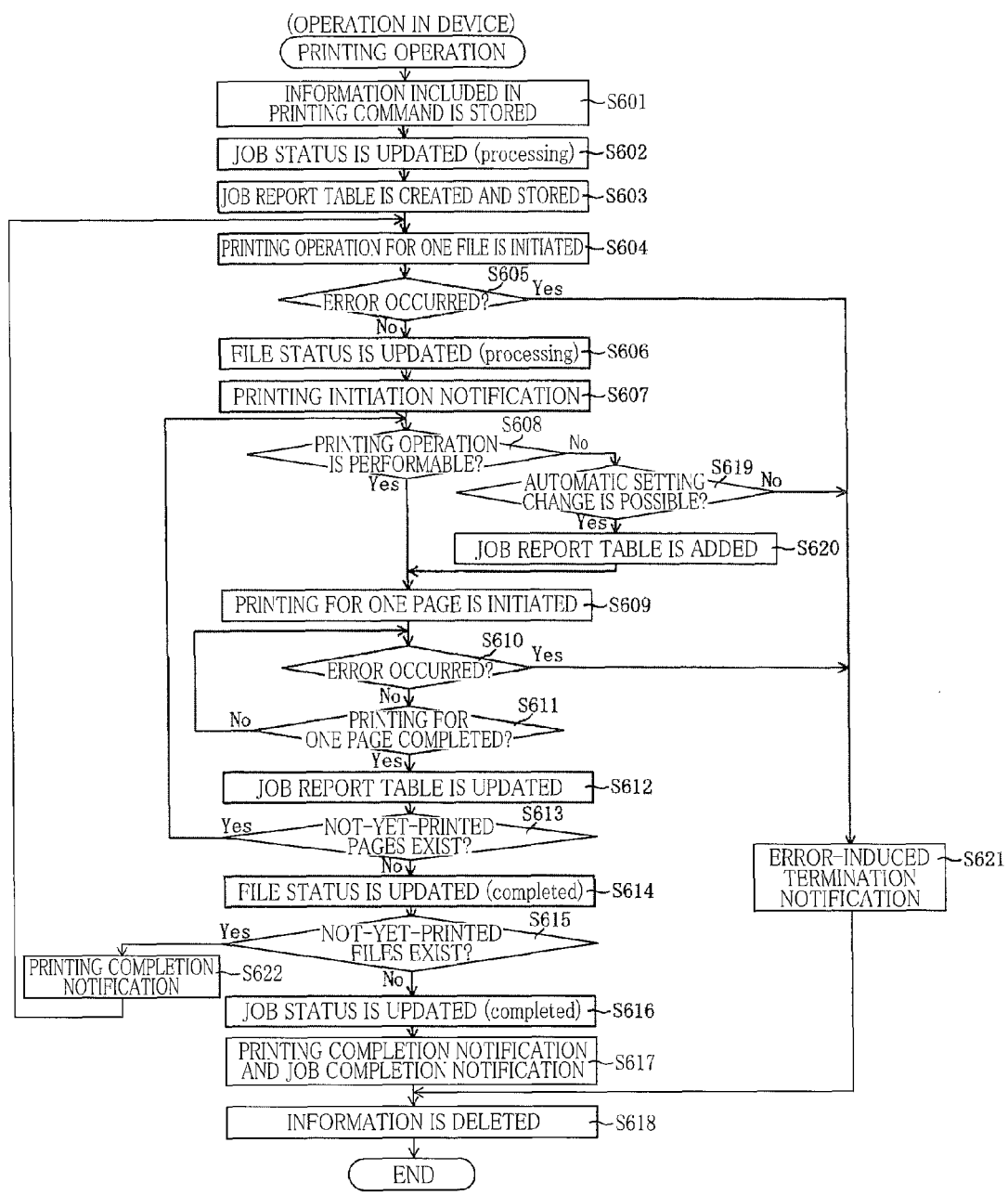
FIG. 6A is a flow chart showing a printing operation performed by a device and FIG. 6B is a flow chart showing an operation upon restart performed by the device.
Figure 6B:
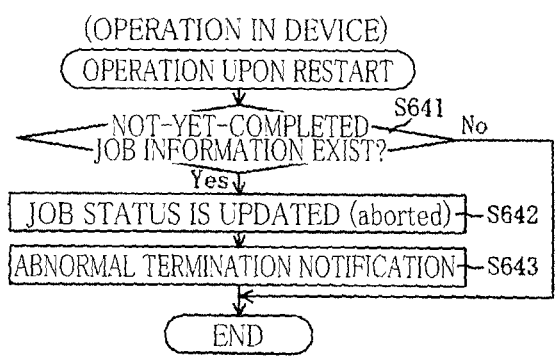

The CPU 11 controls various functions of the device 10 and controls various portions connected to the input-output port 24, according to programs and data stored in the ROM 12, the RAM 13, and the NVRAM 14 or various signals transmitted and received via the NCU 20. The ROM 12 is a read-only memory for storing various programs to be executed by the CPU 11 and constants and tables referred to upon execution of the programs. The ROM 12 stores a control program 12a and so on for controlling operations of the device 10. Processings indicated in flowcharts of FIGS. 6A and 6B are executed by the CPU 11 according to the control program 12a.

The RAM 13 is a rewritable, volatile memory having a temporary area for temporarily storing various sorts of data upon execution of the control program 12a by the CPU 11. The NVRAM 14 is a nonvolatile RAM. In the present embodiment, when the printing operation in accordance with a printing command output from the service providing server 200 is performed, the performing status (hereinafter referred to as "status" where appropriate) of the printing operation is stored in the NVRAM 14.

The operation keys 15 are mechanical keys provided on a housing of the device 10 to receive various setting values and instructions from a user. The LCD 16 is a liquid crystal display device and displays various screens. The touch panel 17 is superposed on a screen of the LCD 16. The touch panel 17 is configured such that, when an input tool such as a finger or a stylus touches or approaches the screen of the LCD 16, the touch panel 17 detects the touch or the approach of the input tool and inputs the detected position to the device 10.

The scanner unit 18 reads an image of a document and converts the read image to image data. The printer unit 19 prints, on a recording sheet, an image based on image data. The modem 21 upon facsimile transmission converts image data to be transmitted, into a signal transmittable to a telephone line network (not shown) and transmits the signal to the telephone line network via the NCU 20. Also, the modem 21 receives a signal from the telephone line network via the NCU 20 to decode the signal into image data. The NCU 20 connects between the telephone line network (not shown) and the device 10, and closes or disconnects the line according to a command transmitted from the modem 21 to control connection between the device 10 and the telephone line network. The LAN_I/F 23 is an interface through which the device 10 performs communication via a local area network. The LAN_I/F 23 is connected to the router 30.

The relay server 100 mainly includes a CPU 101, a storage 102, a network interface (hereinafter referred to as "network I/F" where appropriate) 103. These are connected to one another via an input-output port 104. The CPU 101 controls various portions connected to the input-output port 104 according to programs and data stored in the storage 102.

The storage 102 stores a program 102a. The program 102a includes an operating system (hereinafter referred to as "OS" where appropriate) 102a1 and a management program 102a. The storage 102 may be a computer-readable storage medium. The computer-readable storage medium is a non-transitory medium such as RAM, ROM, EEPROM (that is an abbreviation for "Electrically_Erasable_Programmable_Read-Only_Memory"), a HDD, a buffer of a CPU, or a combination thereof. Each of the RAM, the ROM, the EEPROM, the HDD, the buffer of the CPU or the combination thereof is a tangible medium. Although electric signals for transmitting programs downloaded from a server on the Internet are a computer-readable signal medium as one example of the computer-readable medium, such electric signals are not included in the non-transitory, computer-readable storage medium.

Figure 7:
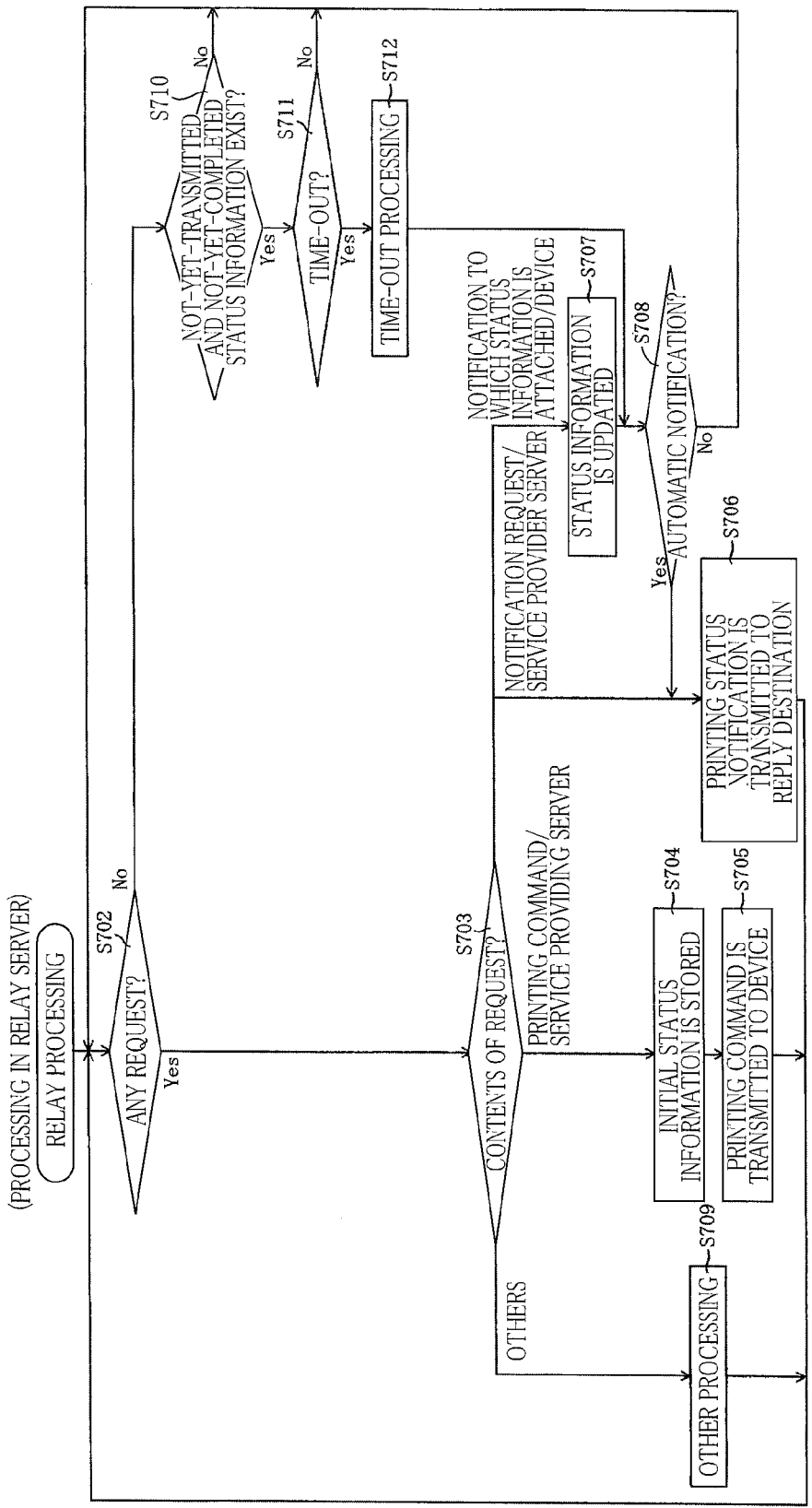
FIG. 7 is a flow chart showing a relay processing executed by a relay server.

The OS 102a1 provides basic functions utilized by the management program 102a2. The OS 102a1 includes programs for controlling the storage 102. The management program 102a2 is a program for managing the status information received from the device 10. Processings in the flow chart of FIG. 7 are executed by the CPU 101 according to the management program 102a2. In the following explanation, the CPU 101 that executes a program such as the OS 102a1 or the management program 102a2 may be simply referred to as the name of the program. For instance, description "the management program" may mean "the CPU 11 that executes the management program".

The storage 102 has a data storage area 102b in which various sorts of data is stored. The management program 102a2 outputs, via the OS 102a1, various sorts of data to be stored in the data storage area 102b. The management program 102a2 obtains, via the OS 102a1, various sorts of data to be stored in the data storage area 102b.

Figure 2A:
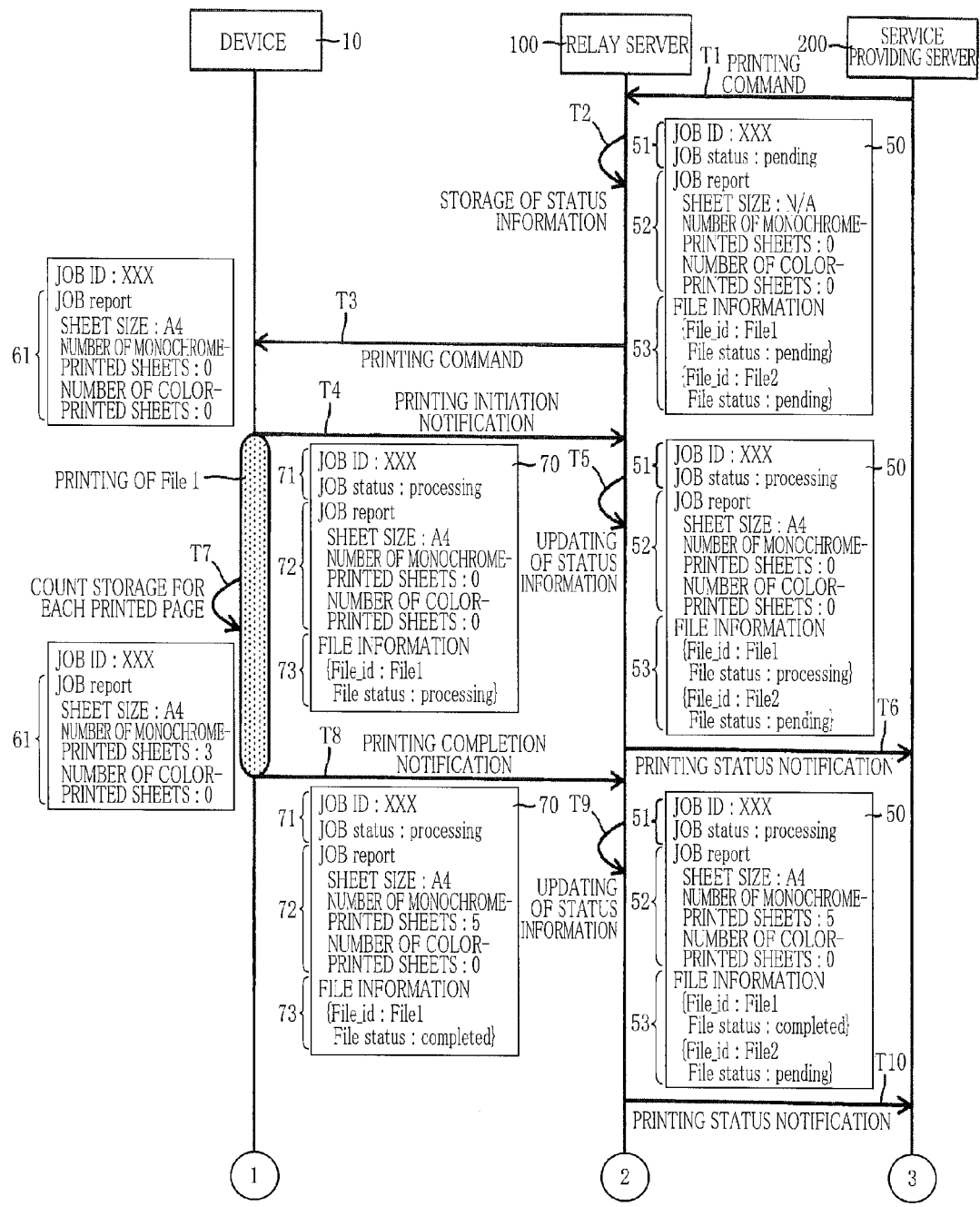
FIGS. 2A and 2B are sequential diagrams showing operations of devices that constitute the operation performing system.
Figure 2B:
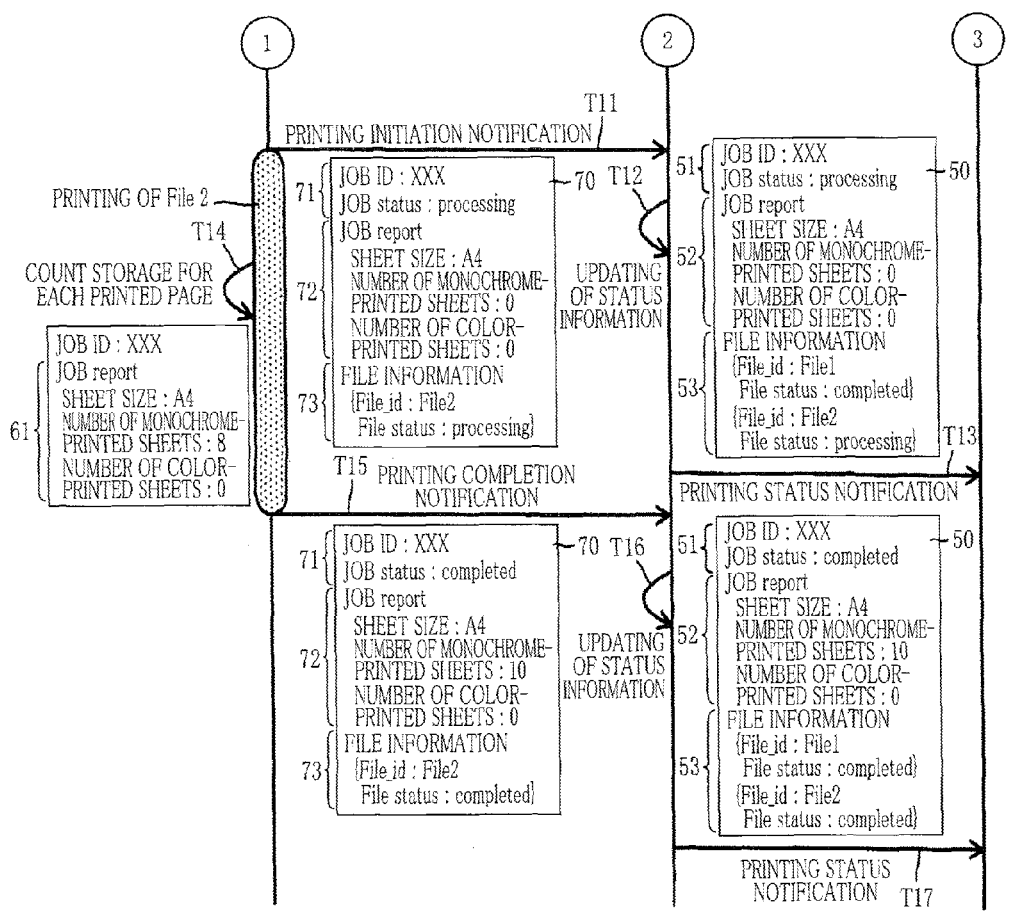

Referring next to FIGS. 2-4, there will be explained operations of the device 10, the relay server 100, and the service providing server 200 when the printing command is transmitted from the service providing server 200 to the device 10 in the operation performing system 1. FIGS. 2A and 2B are sequential diagrams showing a case in which the printing operation based on the printing command has completed successively or normally.

The service providing server 200 transmits a printing command that commands performance of a printing job (T1). The "printing job" is a job for causing a printing operation to be performed on one or a plurality of files. The printing operation is performed for each file. The printing command transmitted from the service providing server 200 includes: service information that identifies the service providing server 200 as a transmission source; device information that identifies the device 10 by which the printing operation is performed; a job ID that identifies the printing job based on the printing command; a file ID that identifies a file as a target of each printing operation included in the printing job, in the printing job identified by the job ID; printing settings, such as a sheet size, utilized in the printing job identified by the job ID; reply-destination information indicative of a reply destination of the status information; and notification setting information indicating whether or not to automatically notify the status information. The file ID is storage-location information indicative of a storage location of the file. In general, each of the reply-destination information and the storage-location information indicates a URL of a database to which the service providing server 200 can make access.

The relay server 100 executes a first reception processing as a processing for receiving the printing command from the service providing server 200. When the relay server 100 receives the printing command from the service providing server 200, the relay server 100 stores status information 50 in an initial state in the nonvolatile data storage area 102b of the storage 102 (T2). Hereinafter, the status information in the initial state will be referred to as "initial status information" where appropriate. The relay server 100 stores, at T2, the status information 50 in association with the service information, the reply-destination information, and the notification setting information included in the printing command received from the service providing server 200.

The status information 50 includes: job information 51 relating to the printing job; a job report table 52 relating to the performing status of the job; and file information 53 relating to each file as a target of the printing operation. The job information 51 includes the job ID and a job status indicative of a performing stage of the job. In the initial status information 50, the value of the job status is "pending" indicating that the printing job is not yet initiated.

The job report table 52 includes the sheet size utilized in the printing operation and the number of sheets on which the printing operation has completed. In the example of FIG. 2 (2A and 2B), the number of monochrome-printed sheets and the number of color-printed sheets are stored independently of each other as the number of printed sheets. In the initial status information 50, initial values are stored for the respective items included in the job report table 52.

The file information 53 includes the file ID that identifies the file for each file as a target of the printing operation and a file status indicative of the performing status of the printing operation on the file. In the initial status information 50, the value of the file status of each file as a target of the printing operation is "pending" indicating that the printing operation is not yet initiated. In the example of FIG. 2, the file information 53 includes two file IDs for respective two files. That is, the printing job commanded by the printing command includes printing on the two files in this example.

The relay server 100 transmits the printing command to the device 10 identified by the device information included in the printing command transmitted from the service providing server 200 (T3). The printing command transmitted from the relay server 100 to the device 10 includes the printing settings and information having the same contents as those of the job information 51 and the file information 53 in the status information 50 stored in the data storage area 102b.

The device 10 executes a second reception processing as a processing for receiving the printing command from the relay server 100. When the device 10 receives the printing command from the relay server 100, the device 10 creates a job report table 61 relating to the performing status of the printing operation based on the printing command. The job report table 61 is stored in the NVRAM 14 in association with the job ID included in the printing command transmitted from the relay server 100. Items included in the job report table 61 are the same as those included in the job report table 52. Where the printing command includes the printing settings that designate the sheet size and the device 10 initiates printing in the sheet size according to the printing settings, the initial value of the sheet size in the job report table 61 is the same as a value of the sheet size included in the printing command.

In this respect, there is an instance in which the device 10 initiates printing in a sheet size preset in the device 10 because the printing command does not include the printing settings that designate the sheet size. In this instance, the initial value of the sheet size is the sheet size preset in the device 10. Where the device 10 cannot initiate printing in the sheet size according to the printing settings even if the printing command includes the printing settings that designate the sheet size, the device 10 initiates printing in a sheet size that allows initiation of printing and that is different from the designated sheet size. In this instance, the initial value of the sheet size is a value different form the value of the sheet size included in the printing command. In the example of FIG. 2, the printing command does not include the printing settings that designate the sheet size, and "A4" preset in the device 10 is stored as the initial value of the sheet size. For the number of printed sheets, "0" is stored as the initial value.

The device 10 initiates the printing operation on one file according to the printing command received from the relay server 100, namely, according to the printing command transmitted from the service providing server 200. Where the printing command includes the printing setting that designate the sheet size and the device 10 can perform printing in the sheet size according to the printing settings, the device 10 performs printing in the sheet size designated by the printing settings. Where the printing command does not include the printing settings that designate the sheet size, the device 10 performs printing in the sheet size preset in the device 10. Where the device 10 cannot perform printing in the sheet size according to the printing settings even if the printing command includes the printing settings that designate the sheet size, the device 10 performs printing in a printable sheet size different from the designated sheet size. Where the printing command includes the printing settings that designate color printing and the device 10 can perform color printing, the device 10 performs color printing. Where the printing command includes the printing settings that designate monochrome printing, the device 10 performs monochrome printing. Where the device 10 cannot perform color printing though the printing command includes the printing settings that designate color printing, the device 10 performs monochrome printing.

The device 10 executes an acquiring processing as a processing for acquiring the files. Specifically, the device 10 obtains or acquires files corresponding to the file IDs included in the printing command based on the file IDs. As explained above, the file ID is the storage-location information, and the device 10 obtains the files from the storage location indicated by the storage-location information. The device 10 initiates the printing operation on each of the obtained files utilizing the printing function. In the example of FIG. 2, the device 10 initiates printing of the files identified by the file IDs. In the example of FIG. 2, the storage-location information represented as URL is described as "File 1" or "File 2" for the sake of convenience. Hereinafter, a file identified by the file ID "File 1" is referred to as "File 1" for distinction from other files. Similarly, a file identified by the file ID "File 2" is referred to as "File 2".

When the device 10 initiates the printing operation of File 1, the device 10 transmits, to the relay server 100, printing initiation notification indicative of initiation of printing of File 1 (T4). To the printing initiation notification, there is added status information 70 indicative of the performing status of printing that is being performed. The status information 70 includes job information 71, a job report table 72, and file information 73. Like the job information 51, the job information 71 includes a job ID and a job status.

Like the job report table 52, the job report table 72 includes the sheet size and the number of sheets on which the printing operation has completed. There are written, into the job report table 72 included in the status information 70, the contents of the job report table 61 stored in the device 10. The file information 73 is information relating to the file on which the operation is being performed. The file information 73 includes a file ID that identifies the file on which the operation is being performed and a file status indicating a performing stage of the printing operation on the file.

In the status information 70 transmitted from the device 10 to the relay server 100 at T4, the job status of the job information 71 is "processing" indicating that the job identified by the file ID has been initiated. In the status information 70, the file status of File 1 of the file information 73 is "processing" indicating that the printing operation of File 1 is being performed by the device 10. In this example, "A4" preset in the device 10 is stored, as the initial value of the sheet size, in the job report table 72 of the status information 70 attached to the printing initiation notification. The status at this stage is a status at the time of initiation of printing, and the number of monochrome-printed sheets and the number of color-printed sheets are both "0".

The relay server 100 executes a third reception processing as a processing for receiving the printing initiation notification from the device 10. When the relay server 100 receives the printing initiation notification from the device 10, the relay server 100 updates the contents of the status information 50 stored in the data storage area 102*b* in accordance with the status information 70 attached to the received printing initiation notification (T5). That is, the job status of the job information 51 is updated to "processing". Further, the status of File 1 in the file information 53 is updated to "processing". Thus, the status information 50 updated at T5 indicates that the job identified by the job ID has been initiated and the printing operation of File 1 has been initiated. The contents of the job report table 52 are updated so as to indicate that the sheet size in printing of File 1 by the device 10 is "A4" and the number of monochrome-printed sheets and the number of color-printed sheets are both "0".

The relay server 100 refers to the data storage area 102*b* and transmits, to the service providing server 200, printing status notification that notifies the status of printing that is being performed in the device 10, on the condition that notification setting is set at automatic notification (T6). The status information 50 updated at T5 is attached to the printing status notification transmitted at T6. At T6, the relay server 100 transmits, as a reply, the printing status notification to the reply destination indicated by the reply-destination information associated with the status information 50 attached to the printing status notification. Consequently, the service providing server 200 can grasp, from the printing status notification received from the relay server 100, the performing status of the printing operation that is being performed in the device 10.

The device 10 updates the contents of the job report table 61 every time when printing of one page for the file under performance, i.e., File 1, has completed (T7). In other words, the device 10 increments the number of printed sheets included in the job report table 61 by "1" at T7. Specifically, when monochrome printing has been performed, the device 10 increments the number of monochrome-printed sheets by "1". When color printing has been performed, the device 10 increments the number of color-printed sheets by "1". FIG. 2 illustrates the job report table 61 in which the sheet size is "A4" and the number of monochrome-printed sheets is "3". That is, the job report table 61 of this example is a job report table at a stage in which printing of File 1 has completed on the A4 sheet in monochrome printing for three pages. For T7 and T14 (that will be described), illustration of the job report table 61 before and after the illustrated stage is dispensed with.

When the printing operation of File 1 has completed, the device 10 transmits, to the relay server 100, printing completion notification indicative of completion of printing of File 1 (T8). The status information 70 is attached to the printing completion notification, like the printing initiation notification. FIG. 2 illustrates the status information 70 including the job report table 72 indicating that the number of monochrome-printed sheets is "5", as one example of the status information 70 attached to the printing completion notification. That is, the status information 70 of this example indicates that printing of File 1 has been performed on the A4 sheet in monochrome printing for five pages. The status information 70 attached to the printing completion notification indicates that the file status in the file information 73 is "completed" and indicates completion of printing of the file identified by the file ID, i.e., File 1.

When the relay server 100 receives the printing completion notification from the device 10, the relay server 100 updates the contents of the status information 50 stored in the data storage area 102b according to the status information 70 attached to the received printing completion notification (T9):

FIG. 2 illustrates the status information 50 including the job report table 52 indicating that the number of monochrome-printed sheets is "5", as one example of the status information 50 updated at T9. That is, the job report table 52 is updated so as to indicate that monochrome printing has been performed on the A4 sheet for five pages according to the status information 70 received from the device 10. Further, the status of File 1 in the file information 53 is updated to "completed". Consequently, the status information 50 updated at T9 indicates that, for the job identified by the job ID, printing of File 1 has completed on the A4 sheet in monochrome printing for five pages.

The relay server 100 transmits, to the service providing server 200, the printing status notification, on the condition that the notification setting is set at automatic notification (T10). The status information 50 updated at T9 is attached to the printing status notification transmitted at T10. Like the reply destination of the printing status notification at T6, the reply destination of the printing status notification at T9 is the reply destination indicated by the reply-destination information associated with the status information 50 attached to the printing status notification. After T10, the service providing server 200 that has received the status information 50 shown in FIG. 2 can grasp that: the device 10 has completed the printing operation of File 1; monochrome printing has been performed on the A4 sheet for five pages in the printing operation of File 1; and the job identified by the job ID is not yet completed.

After completion of the printing operation of File 1, the device 10 subsequently obtains File 2 from the storage location thereof and initiates the printing operation of File 2. When the device 10 initiates the printing operation of File 2, the device 10 transmits, to the relay server 100, the printing initiation notification indicative of initiation of printing of File 2 (T11).

In the status information 70 attached to the printing initiation notification transmitted at T11, the value of the file ID included in the file information 73 is a value that identifies File 2. That is, in the status information 70 transmitted from the device 10 to the relay server 100 at T11, the file status of File 2 in the file information 73 is "processing" indicating that the printing operation of File 2 is being performed in the device 10. In this example, "A4" preset in the device 10 is stored, as the initial value of the sheet size, in the job report table 72 of the status information 70 attached to the printing initiation notification. The status at this stage is a status at the time of initiation of printing, and the number of monochrome-printed sheets and the number of color-printed sheets are both "0".

When the relay server 100 receives, from the device 10, the printing initiation notification indicative of initiation of printing of File 2, the relay server 100 updates the contents of the status information 50 stored in the data storage area 102b according to the status information 70 attached to the received printing initiation notification (T12). That is, the status of File 2 in the file information 53 is updated to "processing". Thus, the status information 50 updated at T12 indicates initiation of the printing operation File 2. Further, the contents of the job report table 52 are updated so as to indicate that the sheet size used in printing of File 2 by the device 10 is "A4" and the number of monochrome-printed sheets and the number of color-printed sheets are both "0".

The relay server 100 transmits the printing status notification to the service providing server 200, on the condition that the notification setting is set at automatic notification (T13). The status information 50 updated at T12 is attached to the printing status notification transmitted at T13. The reply destination of the printing status notification at T13 is the same as the reply destination at T6 and T10.

The device 10 updates the contents of the job report table 61 every time when printing of one page for the file under performance, i.e., File 2, has completed (T14). FIG. 2 illustrates the job report table 61 indicating that the sheet size is "A4" and the number of monochrome-printed sheets is "8". That is, the job report table 61 in this example is a job report table at a stage in which printing of File 2 has completed on the A4 sheet in monochrome printing for eight pages.

When the printing operation of File 2 has completed, the device 10 transmits, to the relay server 100, the printing completion notification indicative of completion of printing of File 2 (T15). FIG. 2 illustrates the status information 70 including the job report table 72 indicating that the sheet size is "A4" and the number of monochrome-printed sheets is "10", as one example of the status information 70 attached to the printing completion notification. That is, the status information 70 in this example indicates that printing of File 2 has been performed on the A4 sheet in monochrome printing for ten pages. The status information 70 attached to the printing completion notification indicates that the file status in the file information 73 is "completed" and indicates completion of printing of the file identified by the file ID, i.e., File 2. In the status information 70 transmitted at T15, the job status in the job information 71 is "completed" and indicates completion of the job identified by the file ID.

When the relay server 100 receives the printing completion notification from the device 10, the relay server 100 updates the contents of the status information 50 stored in the data storage area 102b according to the status information 70 attached to the received printing completion notification (T16). FIG. 2 illustrates the status information 50 including the job report table 52 indicating that the sheet size is "A4" and the number of monochrome-printed sheets is "10", as one example of the status information 50 updated at T16. That is, the contents of the job report table 52 in this example are updated so as to indicate that monochrome printing has been performed on the A4 sheet for ten pages according to the status information 70 received from the device 10. The job status in the job information 51 and the status of File 2 in the file information 53 are both updated to "completed". Consequently, the status information 50 updated at T16 indicates completion of the printing operation of File 2 and completion of the job identified by the job ID.

The relay server 100 transmits the printing status notification to the service providing server 200 on the condition that the notification setting is set at automatic notification (T17). The status information 50 updated at T16 is attached to the printing status notification transmitted at T17. The reply destination of the printing status notification at T17 is the same as the reply destination at T6 and T10. After T17, the service providing server 200 that has received the status information 50 shown in FIG. 2 can grasp that: the device 10 has completed the printing operation of File 2; monochrome printing has been performed on the A4 sheet for ten pages in the printing operation of File 2; and the job identified by the job ID has completed.

FIG. 3 is a sequential diagram showing a case in which the communication between the device 10 and the relay server 100 is disconnected or shut down during performance of the printing operation based on the printing command and the communication is thereafter recovered before time-out occurs. For instance, the case shown in the sequential diagram includes a case in which the power source of the device 10 is turned off during performance of the printing operation based on the printing command and the power source is thereafter turned on before time-out occurs. FIG. 3 illustrates a case in which the same printing command as in FIG. 2 is transmitted from the service providing server 200 and the power source of the device 10 is turned off during performance of the printing operation of File 2. In FIG. 3, the processings at T1-T14 are the same as those of FIG. 2 and explanation thereof is dispensed with.

When the power source of the device 10 is turned off during performance of the printing operation of File 2, the printing operation under performance, namely, the printing operation of File 2, is aborted at a time point when the power source is turned off. In the present embodiment, when the power source of the device 10 is again turned on, the device 10 transmits, to the relay server 100, abnormal termination notification (as one example of notification information) indicative of abnormal termination of the printing operation, namely, indicative of an occurrence of an error. (T21). There is attached, to the abnormal termination notification, status information 80.

The status information 80 includes job information 81 and a job report table 82. Like the job information 51, the job information 81 includes a job ID and a job status. In the status information 80 attached to the abnormal termination notification, the job status of the job information 81 is "aborted" indicating that the job identified by the job ID was aborted.

Like the job report table 52, the job report table 82 includes the sheet size and the number of sheets on which the printing operation has completed. There are written, into the job report table 82 included in the status information 80, the contents of the job report table 61 that has been lastly stored in the nonvolatile storage 102 before turn-off of the power source of the device 10. In other words, the operation performing system 1 of the present embodiment enables the performing statuses of the printing operations performed until immediately before turn-off of the power source of the device 10 to be transmitted to the relay server 100.

FIG. 3 illustrates the status information 80 including the job report table 82 indicating that the sheet size is "A4" and the number of monochrome-printed sheets is "8", as one example of the status information 80 attached to the abnormal termination notification. As explained above, the job status of the job information 81 is "aborted". That is, the status information 80 of this example indicates that, during performance of the job identified by the job ID, an abnormality has occurred at a stage in which, for File 2, monochrome printing has performed on the A4 sheet for eight pages.

When the relay server 100 receives the abnormal termination notification from the device 10, the relay server 100 updates the contents of the status information 50 stored in the data storage area 102b according to the status information 80 attached to the received abnormal termination notification (T22). Thus, in the status information 50 after reception of the abnormal termination notification, the job status of the job information 51 is "aborted". Further, there is stored, in the job report table 52, the performing statuses of the printing operations performed until immediately before turn-off of the power source of the device 10. FIG. 3 illustrates the job report table 52 indicating that the sheet size is "A4" and the number of monochrome-printed sheets is "8". That is, in the example of FIG. 3, there is stored, in the data storage area 102b, the status information 50 indicating that an abnormality has occurred at a stage in which monochrome printing has been performed on the A4 sheet for eight pages.

The relay server 100 transmits to the service providing server 200, error information indicating that the power source of the device 10 has been turned off during the printing operation and the printing status notification, on the condition that the notification setting is set at automatic notification (T23). The status information 50 updated at T22 is attached to the printing status notification transmitted at T23. The reply destination of the error information and the printing status notification is the same as the reply destination indicated by the reply-destination information associated with the status information 50 attached to the printing status notification.

After T23, the service providing server 200 that has received the status information 50 shown in FIG. 3 can grasp that: the abnormality has occurred during performance of the job identified by the job ID; and monochrome printing has been performed on the A4 sheet for eight pages at the stage of occurrence of the abnormality. Consequently, the service providing server 200 can grasp the occurrence of the abnormality and can grasp how far the printing operation has proceeded until before the occurrence of the abnormality, on the basis of the printing status notification received from the relay server 100.

Figure 4A:
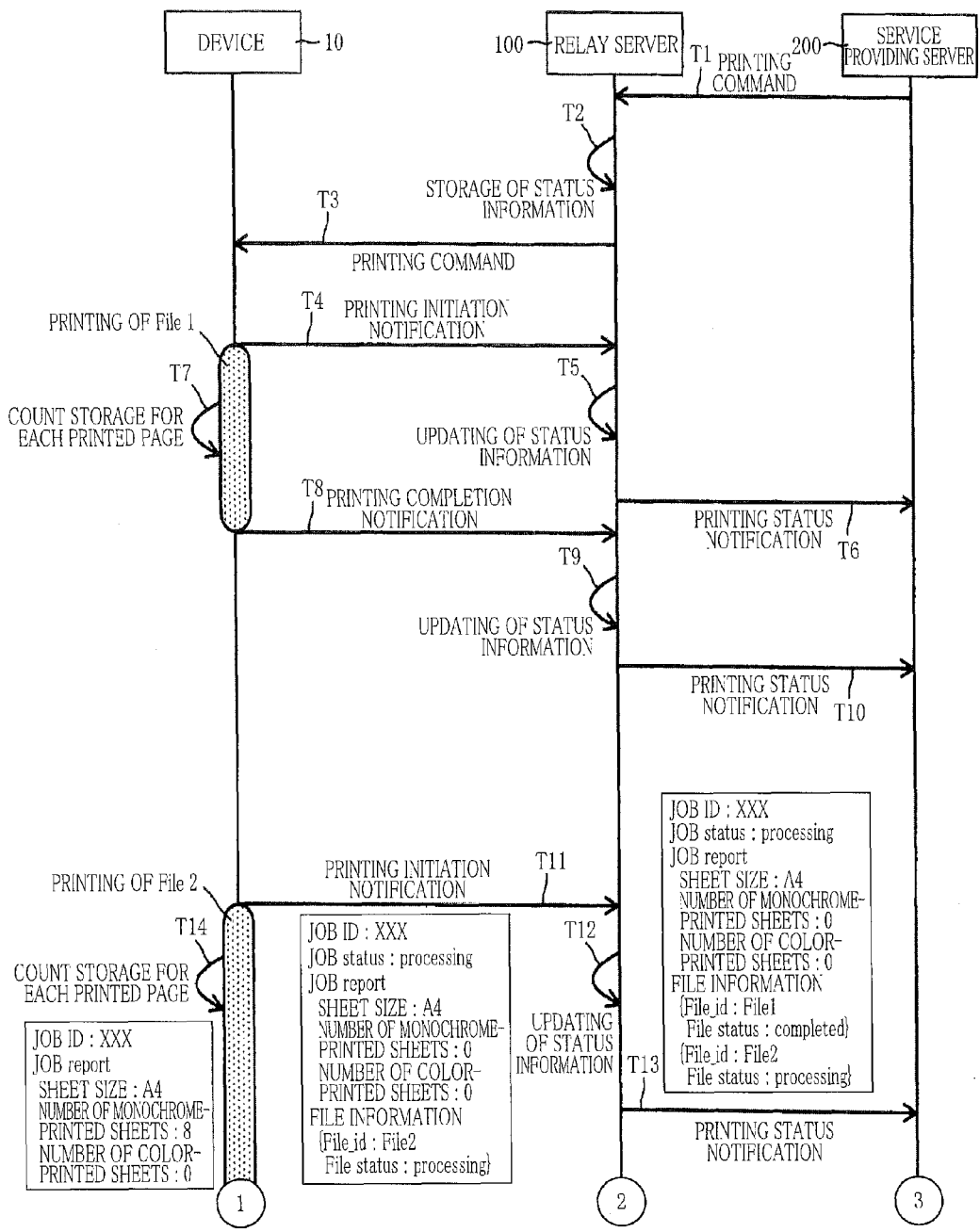
FIGS. 4A and 4B are sequential diagrams showing operations of the devices that constitute the operation performing system.
Figure 4B:
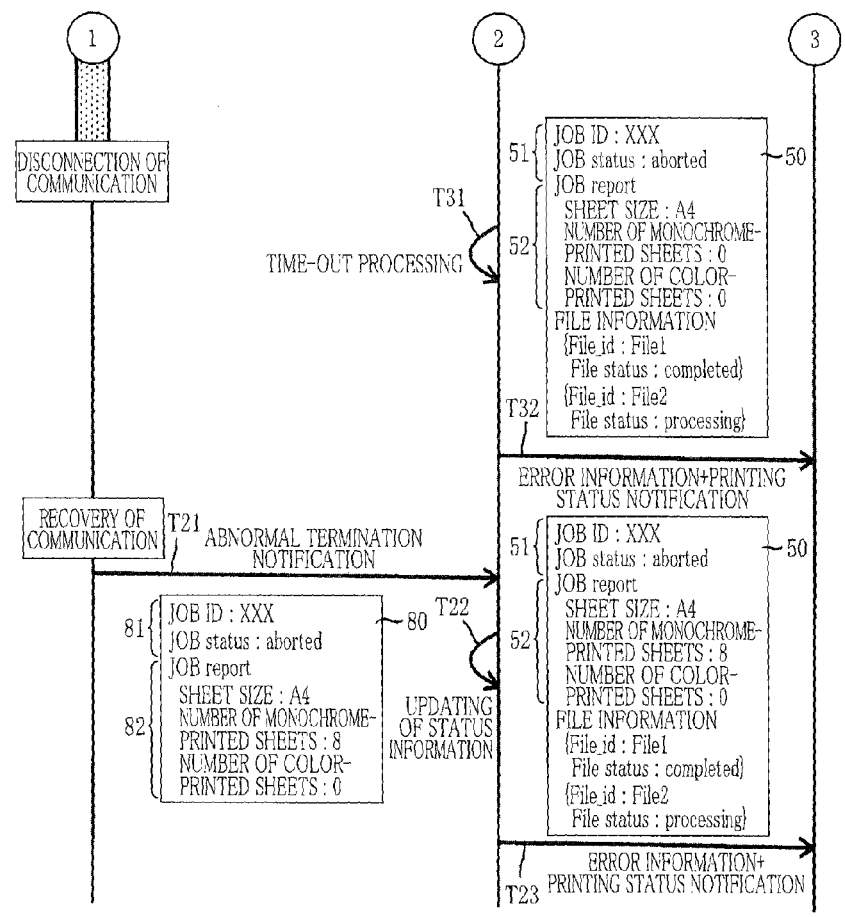

FIGS. 4A and 4B are sequential diagrams showing a case in which the communication between the device 10 and the relay server 100 is disconnected during performance of the printing operation based on the printing command and the communication is not recovered before time-out occurs. For instance, the case shown in the sequential diagram includes a case in which the power source of the device 10 is turned off during performance of the printing operation based on the printing command and the power source is thereafter turned on after time-out has occurred. Further, the case shown in the sequential diagram includes a case in which network equipment between the device 10 and the relay server 100 is out of order or fails to operate for a long period. FIG. 4 (4A, 4B) illustrates a case in which the same printing command as in FIG. 2 is transmitted from the service providing server 200 and the communication between the device 10 and the relay server 100 is disconnected during performance of the printing operation of File 2. In FIG. 4, the processings at T1-T14 are the same as those in FIG. 2 and explanation thereof is dispensed with.

When a predetermined time-out period (e.g., two minutes) has elapsed after a request for communication establishment was lastly made by the device 10 without receiving a next request, the relay server 100 determines that the communication link established between the relay server 100 and the device 10 according to the connection establishment protocol was disconnected and executes a time-out processing (T31). The situation in which the communication link is disconnected includes a situation in which the communication between the device 10 and the relay server 100 is physically interrupted and a situation in which the power source of the device 10 is turned off, for instance. In the time-out processing at T31, the relay server 100 updates the contents of the status information 50 stored in the data storage area 102b to those at the time of the occurrence of the abnormality.

In the example of FIG. 4, the status information stored in the data storage area 102b when the time-out processing at T31 is executed is equal to the status information updated at T12. In the status information 50 updated at T31, the job report table 52 indicates that the number of monochrome-printed sheets and the number of color-printed sheets are both "0". In the meantime, the relay server 100 changes the job status of the job information 51 to "aborted".

The relay server 100 transmits, to the service providing server 200, the printing status notification and the error information indicating that the communication between the device 10 and the relay server 100 was disconnected, on the condition that the notification setting is set at automatic notification (T32). The status information 50 updated at T31 is attached to the printing status notification transmitted at T32. The reply destination of the error information and the printing status notification is the same as the reply destination indicated by the reply-destination information associated with the status information 50 attached to the printing status notification. Consequently, the service providing server 200 can grasp the occurrence of the abnormality and can grasp how far the printing operation has proceeded until before occurrence of the abnormality, on the basis of the printing status notification received from the relay server 100.

When the communication between the device 10 and the relay server 100 is thereafter recovered, the above-indicated processings T21-T23 are executed. That is, when the communication between the device 10 and the relay server 100 is recovered, the device 10 transmits the abnormal termination notification to the relay server 100 (T21). The status information 80 attached to the abnormal termination notification includes, as the job report table 82, the contents of the job report table 62 stored in the NVRAM 14 at the time of disconnection of the communication, as in the case in which the power source of the device 10 has been switched from on to off. In the example of FIG. 4, the job report table 82 indicates that monochrome printing has been performed on the A4 sheet for eight pages. The job status of the job information 81 is "aborted".

When the relay server 100 receives the abnormal termination notification from the device 10, the relay server 100 updates the contents of the status information 50 stored in the data storage area 102b according to the status information 80 attached to the received abnormal termination notification (T22). The status information 80 attached to the abnormal termination notification includes, as the job report table 82, the contents of the job report table 61 stored in the NVRAM 14 at the time of disconnection of the communication. In the example of FIG. 4, the contents of the job report table 82 are updated so as to indicate that monochrome printing has been performed on the A4 sheet for eight pages. The contents of the job report table 52 in the status information 50 updated at T31 are updated to more accurate contents at T22 subsequently executed, in terms of how far printing has been performed before the occurrence of the abnormality.

The relay server 100 transmits, to the service providing server 200, the printing status notification and the error information indicating that the power source of the device 10 has been turned off during performance of the printing operation, on the condition that the notification setting is set at automatic notification (T23). The status information 50 updated at T22 is attached to the printing status notification transmitted at T23. Consequently, the service providing server 200 can grasp how far the printing operation has proceeded until before the occurrence of the abnormality on the basis of the printing status notification received from the relay server 100 and transmitted to the service providing server 200 at T23.

Figure 5:
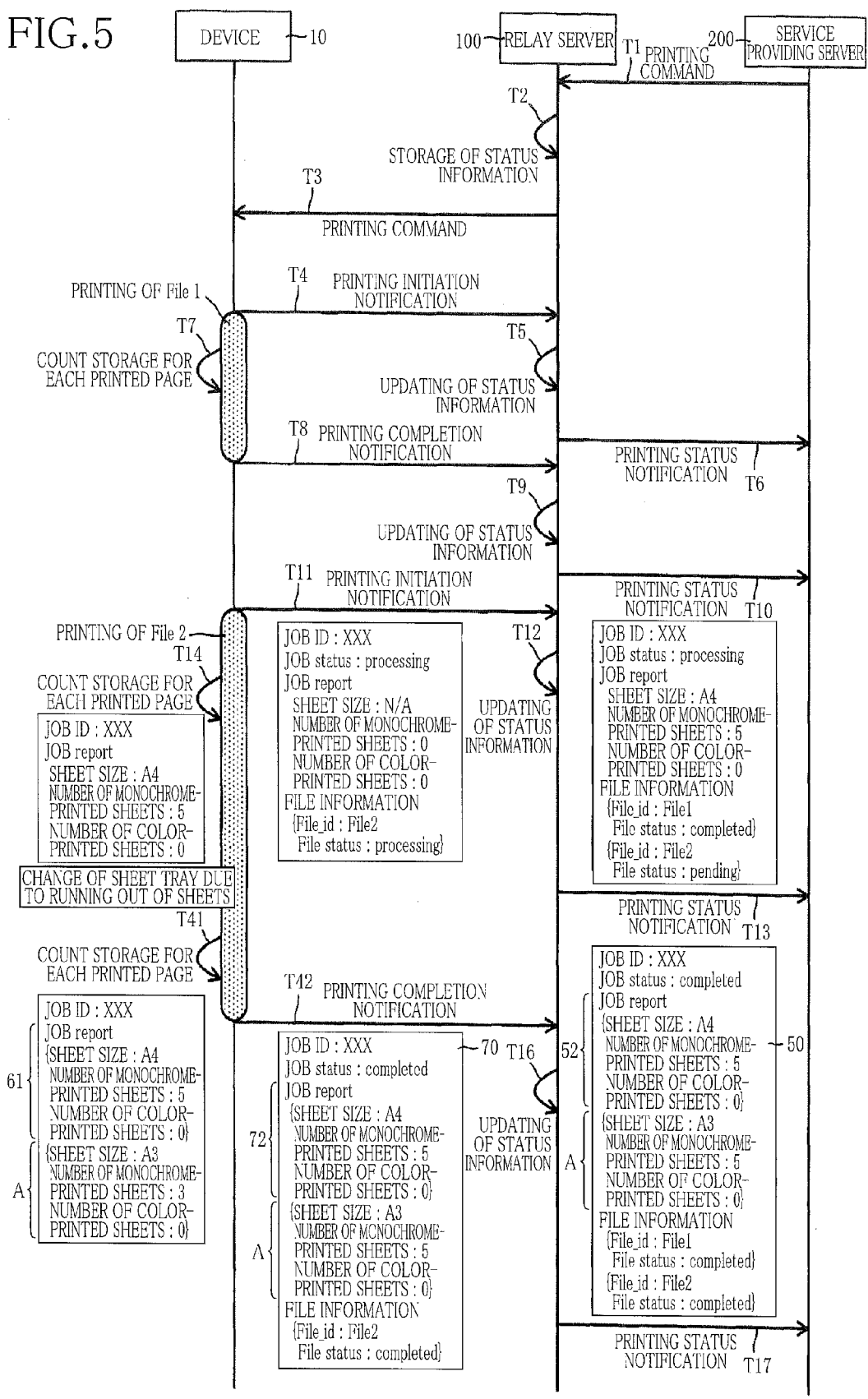
FIG. 5 is a sequential diagram showing operations of the devices that constitute the operation performing system.

FIG. 5 is a sequential diagram showing a case in which the printing settings are changed during performance of the printing operation based on the printing command and the printing operation is thereafter continued. FIG. 5 illustrates a case in which the same printing command as in FIG. 2 is transmitted from the service providing server 200 and the printing settings are changed in the printing operation of File 2. In FIG. 5, the processings at T1-T14 are the same as those in FIG. 2 and explanation thereof is dispensed with.

Where the A4 sheets set in the sheet tray run out when the device 10 is performing the printing operation of File 2 using the A4 sheets, the device 10 continues the printing operation using the sheets set in another sheet tray in place of the A4 sheets if printing by use of the sheets set in another sheet tray is set in the device 10. For instance, the device 10 continues the printing operation using A3 sheets.

Where the device 10 continues the printing operation using the sheets set in another sheet tray, a job report table A indicative of the performing status of the printing operation after the change is added to the job report table 61 and is stored in the NVRAM 14. The job report table A includes the sheet size after the change and the number of sheets on which printing has been performed using the sheets in the changed sheet size. The device 10 updates the contents of the added job report table A every time when printing of one page is completed (T41).

In the example of FIG. 5, the job report table A is added which indicates that the sheet size is "A3" and the number of monochrome-printed sheets is "3". The job report table 61 indicates that monochrome printing has been performed on the A4 sheet for five pages. This example thus indicates that the sheet size is changed to A3 after monochrome printing has been performed on the A4 sheet for five pages and monochrome printing has been subsequently performed on the A3 sheet for three pages.

In the example of FIG. 5, the printing settings, i.e., the sheet size, are changed once, and one job report table A is added. The number of added job report tables A is incremented by one every time when the printing settings are changed.

When the printing operation of File 2 completes, the device 10 transmits, to the relay server 100, the printing completion notification indicative of completion of printing of File 2 (T42). Where the printing settings are changed during performance of the printing operation, the status information 70 attached to the printing completion notification transmitted at T42 includes the contents of the job report table A added by the device 10.

FIG. 5 illustrates the status information including the job report table 72 indicating that monochrome printing has been performed on the A4 sheet for five pages and the job report table A indicating that monochrome printing has been performed on the A3 sheet for five pages, as one example of the status information 70 attached to the printing completion notification when the printing settings are changed during performance of the printing operation. In other words, the status information 70 indicates that, for File 2, the sheet size is changed to A3 after monochrome printing has been performed on the A4 sheet for five pages and monochrome printing has been subsequently performed on the A3 sheet for five pages.

When the relay server 100 receives the printing completion notification from the device 10, the relay server 100 executes the processing at T16. That is, the relay server 100 updates the contents of the status information 50 stored in the data storage area 102b according to the status information 70 attached to the received printing completion notification. Where the printing settings are changed during performance of the printing operation, the status information 50 updated at T16 includes the job report table A with the changed printing settings, in addition to the job report table 52 with the original printing settings. For instance, the updated status information 50 shown in FIG. 5 includes the job report table 52 indicating that monochrome printing has been performed on the A4 sheet for five pages and the job report table A indicating that monochrome printing has been performed on the A3 sheet for five pages.

After the processing at T16, the relay server 100 executes the processing at T17. That is, the relay server 100 transmits the printing status notification to the service providing server 200, on the condition that the notification setting is set at automatic notification. After T17, the service providing server 200 that has received the status information 50 shown in FIG. 5 can grasp that the sheet size is changed to A3 after monochrome printing has been performed on the A4 sheet for five pages and monochrome printing has been subsequently performed on the A3 sheet for five pages.

FIG. 6A is a flow chart showing the printing operation performed by the CPU 11 of the device 10 according to the control program 12a. This operation is initiated when the device 10 receives the printing command from the relay server 100.

The CPU 11 stores various sorts of information included in the received printing command (S601). Specifically, the CPU 11 stores, in the NVRAM 14, the job information in association with the job ID included in the job information. Further, the CPU 11 stores, in the RAM 13, the file information and the printing settings in association with the job ID included in the job information.

The CPU 11 updates the job status included in the job information from "pending" to "processing" (S602). The CPU 11 creates the job report table 61 and stores the created job report table 61 in the NVRAM 13 in association with the job ID included in the received job information (S603). In the job report table 61 created at S603, the initial value of the sheet size is set as described above, and the initial value of the number of printed sheets is set to zero.

The CPU 11 initiates the printing operation for one file among the printing operations to be performed for the printing job commanded by the printing command (S604). The CPU 11 then determines whether any error that makes it impossible to continue the printing operation, such as opening of a cover of the device 10, has occurred (S605). If the CPU 11 determines that the error has occurred (S605: Yes), the CPU 11 transmits, to the relay server 100, an error-induced termination notification indicating that the operation has been terminated due to an occurrence of an error (S621). When the relay server 100 receives the error-induced termination notification from the device 10, the relay server 100 transmits the error-induced termination notification to the service providing server 200.

After S621, the CPU 11 deletes the information stored in the RAM 13 and the NVRAM 14 (S618) and ends the operation. Specifically, the CPU 11 deletes the job information, the file information, and the job report table 61.

If the CPU 11 determines that any error has not occurred (S605: No), the CPU 11 updates the file status of a file as a target of the printing operation (hereinafter referred to as "operation target file" where appropriate) from "pending" to "processing" (S606). The CPU 11 then transmits, to the relay server 100, the printing initiation notification indicative of initiation of printing of the operation target file (S607). At S607, the CPU 11 transmits, to the relay server 100, the status information 70 at that time, together with the printing initiation notification. S607 corresponds to T4 and T11 in the sequential diagram indicated above.

The CPU 11 determines whether the printing operation can be performed (S608). Here, when the printing job is initiated, the CPU 11 determines whether it is possible to print according to the printing settings included in the printing command. Specifically, where the color printing is designated in the printing settings, the CPU 11 may determine whether the color printing is performable, whether printing is performable in the sheet size included in the printing settings, and so on. In the midst of the printing job, the CPU 11 may determine whether printing is performable according to the printing settings according to which printing in the printing job has been performed so far. Specifically, where color printing in the A4 sheet size has been performed so far, the CPU 11 may determine whether color printing in the A4 sheet size is subsequently performable. In this instance, the CPU 11 may determine whether an output signal from the printer unit of the device 10 indicates that the A4 size sheets and the coloring agents remain. If the CPU 11 determines that the printing operation is performable (S608: Yes), the CPU 11 initiates printing for one page included in the operation target file utilizing the printing function of the device (S609).

If the CPU 11 determines that the printing operation is not performable (S608: No), the CPU 11 determines whether an event that makes it impossible to perform the printing operation can be handled by an automatic setting change (S619). Suppose a case in which the sheets in the desired sheet size set in the sheet tray run out. In this case, if the device 10 has settings to automatically change the sheet size to that of the sheets set in another sheet tray, the CPU 11 determines that the event can be handled by the automatic setting change and makes an affirmative decision at S619. Even where the coloring agents do not remain, the CPU 11 makes an affirmative decision at S619 if the device 10 has settings to automatically change to monochrome printing. In some instances, the printing command does not include settings whether or not to allow the automatic setting change, and the device 10 has the settings in advance. The printing command may include the settings whether or not to allow the automatic setting change.

If the CPU 11 makes an affirmative decision at S619 (S619: Yes), the CPU 11 changes the settings and adds the job report table A indicating the performing status of the printing operation according to the changed settings (S620). After S620, the CPU 11 initiates printing for one page included in the operation target file according to the changed settings (S609). On the other hand, if the CPU 11 determines that the event that makes it impossible to perform the printing operation cannot be handled by the automatic setting change (S619: No), the CPU 11 executes S621.

The CPU 11 waits for completion of printing for one page initiated at S609 without an occurrence of any error (S610: No, S611: No). When any error has occurred during printing for one page initiated at S609 (S610: Yes), the CPU 11 executes S621. On the other hand, when printing for one page has completed without an occurrence of any error (S611: Yes), the CPU 11 updates the job report table 61 or the job report table A (S612). Where monochrome printing for one page has completed, the CPU 11 increments, by one, the number of monochrome-printed sheets included in the job report table 61 or the job report table A. S612 corresponds to T7, T14, and T41 in the sequential diagram indicated above.

After S612, the CPU 11 determines whether any not-yet-printed pages exist in the operation target file (S613). If the CPU 11 determines that the not-yet-printed pages exist (S613: Yes), the CPU 11 executes S608 and initiates printing for one page among the not-yet-printed pages.

On the other hand, if the CPU 11 determines that no not-yet-printed pages exist, namely, when printing for all pages of the operation target file has completed (S613: No), the CPU 11 updates the file status of the operation target file from "processing" to "completed" (S614). The CPU 11 then determines whether any not-yet printed files exist in the printing operations performed by the printing job commanded by the printing command (S615).

If the CPU 11 determines that the not-yet-printed files exist (S615: Yes), the CPU 11 transmits, to the relay server 100, the printing completion notification indicative of completion of printing of the operation target file (S622). At S622, the CPU 11 transmits, to the relay server 100, the status information 70 at that time, together with the printing initiation notification. S622 corresponds to T8 in the sequential diagram indicated above. That is, the CPU 11 executes a delete processing as a processing for deleting the information.

If the CPU 11 determines that no not-yet-printed files exist, namely, when all of the printing operations performed based on the printing job commanded by the printing command have completed (S615: No), the CPU 11 updates the job status included in the job information from "processing" to "completed" (S616).

The CPU 11 transmits, to the relay server 100, the printing completion notification indicative of completion of printing of the operation target file and a job completion notification indicative of completion of the printing job commanded by the printing command (S617). S617 corresponds to T15 and T42 in the sequential diagram indicated above. After S617, the CPU 11 deletes the information stored in the RAM 13 and the NVRAM 14 (S618) and ends the operation.

FIG. 6B is a flow chart showing an operation upon restart performed by the CPU 11 of the device 10 according to the control program 12a. This operation is initiated when the power source of the device 10 is switched from off to on or when the connection between the device 10 and the relay server is changed from offline to online.

The CPU 11 determines whether any not-yet-completed job information exist (S641). Specifically, the CPU 11 makes an affirmative decision at S641 if the job information is stored in the NVRAM 14. On the other hand, if no job information is stored in the NVRAM 14, the CPU 11 makes a negative decision at S641. When the CPU 11 makes a negative decision at S641 (S641: No), the CPU 11 ends the operation.

On the other hand, if the CPU 11 makes an affirmative decision at S641 (S641: Yes), the CPU 11 updates the job status included in the job information stored in the NVRAM 14 from "processing" to "aborted" (S642). The CPU 11 then transmits, to the relay server 100, the abnormal termination notification indicative of abnormal termination of the printing operation (S643) and ends the operation. At S643, the CPU 11 transmits, to the relay server 100, the status information 80 indicative of the performing status of the printing operation performed until immediately before turn-off of the power source of the device 10, together with the abnormal termination notification. S643 corresponds to T21 in the sequential diagram indicated above.

FIG. 7 is a flow chart showing a relay processing executed by the CPU 101 of the relay server 100 according to the management program 102a2. This processing is initiated when the relay server 100 is turned on.

The CPU 101 waits for a request from the device 10 or the service providing server 200 (S702: No). When the CPU 101 receives a request from the device 10 or the service providing server 200 (S702: Yes), the CPU 101 confirms contents of the received request (S703).

If the CPU 101 confirms that the received request is the printing command transmitted from the service providing server 200 (S703: printing command/service providing server), the CPU 101 stores the initial status information 50 in the nonvolatile data storage area 102b of the storage 102 (S704). S704 corresponds to T2 in the sequential diagram indicated above. The CPU 101 stores the initial status information 50 in association with the service information, the reply-destination information, the notification setting, and so on, included in the received printing command.

The CPU 101 transmits the printing command to the device 10 identified by the device information included in the printing command received from the service providing server 200 (S705) and subsequently executes S702. S705 corresponds to T3 in the sequential diagram indicated above.

If the CPU 101 confirms that the received request is a notification to which the status information transmitted from the device 10 is attached (S703: notification to which status information is attached/device), the CPU 101 executes S707. The notification to which the status information is attached is the printing initiation notification to which the status information 70 is attached, the printing completion notification to which the status information 70 is attached, or the abnormal termination notification to which the status information 80 is attached.

The CPU 101 updates the contents of the status information 50 stored in the data storage area 102b according to the status information 70, 80 attached to the notification received from the device 10 (S707). At S707, the CPU 101 updates the contents of the status information 50 that include the same job ID as the job ID included in the status information 70, 80. S707 corresponds to T5, T9, T12, T16, and T22 in the sequential diagram indicated above.

The CPU 101 determines whether automatic notification is set for the service providing server 200 as the transmission source of the printing command that includes the job ID included in the status information 70, 80 (S708). The setting of automatic notification is stored in the storage 102 in association with the service information that identifies the service providing server 200, for each service providing server 200 connected to the relay server 100.

If the CPU 101 determines that automatic notification is set for the service providing server 200, (S708: Yes), the CPU 101 transmits the printing status notification to the reply destination (S706) and executes S702. The reply destination at S706 is the reply destination indicated by the reply-destination information associated with the status information 50 attached to the printing status notification. When the printing status notification is a notification based on that the relay server 100 receives the abnormal termination notification from the device 10 or a notification based on that the communication between the device 10 and the relay server 100 is disconnected, the CPU 101 transmits at S706 the error information, together with the printing status notification. S706 corresponds to T6, T10, T13, T17, T23, and T32 in the sequential diagram indicated above.

On the other hand, if the CPU 101 determines that automatic notification is not set for the service providing server 200 (S708: No), the CPU 101 executes S702. The service providing server 200 for which automatic notification is not set requests the printing status notification by designating the job ID, whereby the service providing server 200 can receive the printing status notification that includes the status information 70, 80 including the designated job ID every time when the service providing server 200 requests the printing status notification. The timing at which the service providing server 200 requests the printing status notification includes regular timing (e.g., every one day) and timing at which an instruction for requesting the printing status notification is input by an operation on the service providing server 200, for instance.

If the CPU 101 determines that the received request is a request transmitted from the service providing server 200 for requesting the printing status notification (S703: notification request/service providing server), the CPU 101 transmits the printing status notification that includes the status information 70, 80 including the job ID designated by the request, to the reply destination designated by the request (S706) and subsequently executes S702.

If the CPU 101 determines that the received request is a request other than that transmitted from the device 10 or the service providing server 200 (S703: others), the CPU 101 executes the other processing (S709) and subsequently executes S702. Where the received request is the error-induced termination notification transmitted from the device 10, the CPU 101 transmits the error-induced termination notification to the service providing server 200.

Where the CPU 101 does not receive any request from the device 10 or the service providing server 200 (S702: No), the CPU 101 determines whether any not-yet-completed status information 50 that is not yet transmitted to the service providing server 200 exist in the data storage area 102*b* (S710). The not-yet-completed status information 50 is the status information 50 in which the job status of the job information 51 is "processing" or "pending".

If the CPU 101 determines that no such status information 50 exist (S710: No), the CPU 101 executes S702. If the CPU 101 determines such status information 50 exists (S710: Yes), the CPU 101 determines whether a predetermined time-out period (e.g., two minutes) has elapsed after a request for communication establishment was lastly made by the device 10 without receiving a next request (S711). If the CPU 101 determines that the predetermined time-out period has not yet elapsed (S711: No), the CPU 101 executes S702.

On the other hand, if the CPU 101 determines that the predetermined time-out period has elapsed (S711: Yes), the CPU 101 executes a time-out processing (S712). Specifically, the CPU 101 updates the contents of the status information 50 stored in the data storage area 102*b* to those at the time of occurrence of an error. That is, the CPU 101 changes the job status of the job information 51 to "aborted". S712 corresponds to T31 in the sequential diagram indicated above.

After S712, the CPU 101 executes S708. When the communication time-out occurs, the CPU 101 deletes the status information 50 updated in the time-out processing (S712) after a lapse of a predetermined period (e.g., one day). Thus, when the service providing server 200 for which automatic notification is not set requests the printing status notification after the occurrence of the communication time-out, the printing status notification is transmitted to the service providing server 200 on the condition that the status information 50 in question remains in the data storage area 102*b*.

According to the present embodiment, in the structure including the device 10, the service providing server 200 that issues, with respect to the device 10, the printing command that causes the device 10 to perform the printing operation, and the relay server 100 interposed between the service providing server 200 and the device 10, the relay server 100 updates the status information 50 stored in the data storage area 102*b* according to the status information 70, 80 transmitted from the device 10 at the time of imitation and completion of the printing operation for one file, every time when the status information 70, 80 is transmitted. Consequently, the relay server 100 can notify, to the service providing server 200, the status of the printing operation (i.e., the performing status of the printing operation) during performance of the printing operation by the device 10 at any time.

Consequently, even when the power source of the device 10 is turned off during performance of the printing operation by the device 10, it is possible to notify the service providing server of the status of the operation immediately before turn-off of the power source of the device 10, together with the error information. Further, even when the communication between the device 10 and the relay server 100 is disconnected during performance of the printing operation by the device 10, it is possible to notify the service providing server of the status immediately before disconnection of the communication, together with the error information.

When printing is performed at the printing settings different from those included in the printing command, such as when the sheet tray is changed due to running out of the sheets, during performance of the printing operation by the device 10, the job report table A that stores the status of the printing operation performed at the different settings is added to the status information 70, 80. Consequently, the relay server 100 can notify the service providing server 200 of the status of the printing operation performed according to the changed printing settings.

The device 10 updates the job report table 61 that stores the status of the printing operation at predetermined timing such as at the time of initiation or completion of the printing operation for one file or at the time of completion of printing for one page. The job information and the job report table 61 are stored in the nonvolatile NVRAM 14. Therefore, even if the power source of the device 10 is turned off during performance of the printing operation, the status immediately before turn-off of the power source of the device 10 can be retained. Consequently, when the power source of the device 10 is again turned on, it is possible to transmit, to the relay server 100, the status information 80 including the status immediately before turn-off of the power source of the device 10.

The job report table 61 and the additional job report table A include the number of sheets on which the printing operation has completed. It is thus possible to store, in the NVRAM 14, on how many pages among pages of one file the printing operation has completed. Consequently, when the power source of the device 10 is turned off during performance of the printing operation, it is possible to notify the relay server 100 and the service providing server 200 of the number of pages on which the printing operation has been performed until immediately before turn-off of the power source of the device 10. In particular, the number of printed sheets is stored individually for color printing and monochrome printing. It is thus possible to notify the relay server 100 and the service providing server 200 of the number of pages for which color printing has been performed and the number of pages for which monochrome printing has been performed until immediately before turn-off of the power source of the device 10.

The device 10 stores the job information, the job report table 61, etc., in the nonvolatile NVRAM 14 while stores the file information in the volatile RAM 13. It is sufficient for the file information to be transmitted at the time of initiation of the printing operation of each file. Therefore, even if the power source of the device 10 is turned off during performance of the printing operation, it doesn't matter. It is thus possible to reduce usage of the NVRAM 14 by storing the file information in the RAM 13. Where the file ID included in the file information, namely, the storage information, is URL, the data size is relatively large. In this respect, to store the file information in the RAM 13 is preferable in terms of reduction in usage of the NVRAM 14.

Every time when the status information 50 stored in the data storage area 102b is updated, the relay server 100 successively transmits the status information 50 to the service providing server 200 identified by the service information associated with the status information, namely, to the service providing server 200 as the transmission source of the printing command including the status information. The status of the printing operation performed based on the printing command can be thus notified to the service providing server 200 as the transmission source of the printing command. In particular, the status of the printing operation is transmitted to the reply destination indicated by the reply-destination information included in the printing command. Consequently, the status information can be transmitted to the reply destination requested by the service providing server.

The successive transmission described above is executed on the condition that automatic notification is set for the service providing server 200 as the transmission destination of the status information 50. For the service providing server 200 for which automatic notification in not set, on the other hand, the status information 50 is transmitted in response to a request from the service providing server 200. It is thus possible to transmit the status information 50 to the service providing server in a fashion suitable for each service providing server 200.

In the present embodiment, the operation performing system 1 is one example of an operation performing system. The relay server 100 is one example of a relay server. The device 10 is one example of a device. The service providing server 200 is one example of a service providing server. The router 30 is one example of a router. The Internet 800 is one example of an internet. The storage 102 is one example of a first storage and a storage. The NVRAM 14 is one example of a second storage and a nonvolatile storage. The RAM 13 is one example of a third storage. The network OF 103 is one example of a communication portion. The CPU 101 is one example of a control portion. The LAN_I/F 23 is one example of a communication portion. The CPU 11 is one example of a control portion. The printer unit 19 is one example an operation performing portion configured to perform a certain operation. The file is one example of operation information. Each page of the file is one example of a portion included in the operation information. The file ID is one example of specific information. The printing command is one example of performance command. The status information 50, 70, 80, and the error information are one example of status information. The service information is one example of service identifying information. The printing settings are one example of setting information. The reply-destination information is one example of destination identifying information.

T1 executed by the service providing server 200 is one example of first command-transmission processing. S705 executed by the CPU 101 is one example of second command-transmission processing. S604 executed by the CPU 11 is one example of operation performing processing. S607, S622, S617, S643 executed by the CPU 11 are one example of first status-transmission processing. S704 executed by the CPU 101 is one example of first storage processing. S704 and S707 executed by the CPU 101 are one example of second storage processing. S706 executed by the CPU 101 is one example of second status-transmission processing. S602, S603, S606, S612, S614, S616, S620, and S642 executed by the CPU 11 are one example of third storage processing. S601 executed by the CPU 11 is one example of fourth storage processing. The processing at S704 in which the router 30 relays the setting information transmitted by the relay server 100 to the device 10 for which connection according to the XMPP over BOSH is being established and the device 10 receives the setting information is one example of server-push.

While the embodiment of the present invention has been described in detail, it is to be understood that the invention is not limited to the details of the embodiment illustrated above, but may be embodied with other changes and modifications without departing from the spirit and the scope of the invention defined in appended claims.

In the illustrated embodiment, the service provided by the service providing server 200 causes the device 10 to perform the printing operation. The invention is applicable to a case in which the service providing server 200 provides a service that causes the device 10 to perform not only the printing operation, but also other operations such as a scanning operation.

In the illustrated embodiment, the MFP is illustrated as the device 10. The invention is applicable to a device having a single function as a printer or a scanner as long as the device can utilize a service provided by the service providing server 200. The device 10 may be a sewing machine configured to embroider a predetermined image or to perform quilting, on the basis of instruction data or the like. The device 10 may be a sewing machine configured to perform decorative stitching, sewing, or the like to form a work or a product based on image data. The device 10 may be a 3D printer configured to form 3D images by spraying, sharpening, or the like, based on instruction data or the like. The device 10 may be a machine tool configured to perform machine work on a material based on instruction data or the like. The device 10 may be a device configured to play music or a device to screen images. The invention is applicable to a sensing device configured to periodically obtain some sorts of information or an operation management device configured to manage operations in home equipment, factory equipment, or the like.

In the illustrated embodiment, the sheet size is illustrated as the printing settings included in the printing command. The printing settings may include settings as to double-sided printing or single-sided printing and settings as to marginless printing or printing with margins.

In the illustrated embodiment, the device 10 stores the file information in the RAM 13. The device 10 may store the file information in the NVRAM 13.

In the illustrated embodiment, the device 10 transmits the status information 70 to the relay server 100 at timing of initiation or completion of printing of one file. The device 10 may transmit the status information 70 at other timing. For instance, the device 10 may transmit the status information 70 to the relay server 100 every time when printing for one page completes.

In the illustrated embodiment, the device 10 updates the job report table 61 or the job report table A every time when printing for one page is performed. The timing of updating need not be necessarily on a page basis. Where a file without a page concept, such as an Excel file, is printed, for instance, the job report table 61, etc., may be updated every time when printing for one sheet is performed.

In the illustrated embodiment, the relay server 100 is configured not to transmit the service information to the device 10. The relay server 100 may be configured to transmit the service information to the device 10. In the meantime, the device 10 may be configured such that, when the status information 70, 80 is transmitted to the relay server 100, the device 10 may transmit the corresponding service information. In such an instance, the relay server 100 can transmit the status information 70, 80 to the service providing server 200 to which the status information 70, 80 should be transmitted, without identifying sever information from the job ID.

In the illustrated embodiment, the file status is not included in the status information 80 attached to the abnormal termination notification. The status information 80 may include, as "aborted", the status of the file on which the printing operation has been performed at the time of occurrence of the abnormality, The file status of each file may be updated to "aborted" at timing of updating the job status in the status information 50 to "aborted".

In the illustrated embodiment, the relay server 100 makes a call-back of the printing status notification only with respect to the service providing server 200 for which the notification setting is set at automatic notification. The relay server 100 may automatically make a call-back depending upon situations even where the notification setting is not set at automatic notification. For instance, when the communication between the device 10 and the relay server 100 is disconnected, the relay server 100 may transmit the printing status notification and the error information to the service providing server 200 even where the notification setting is not set at automatic notification.

In the illustrated embodiment, the setting of the sheet size and the setting for designating color printing or monochrome printing are illustrated as the printing settings for the printing operation. The printing settings are not limited to those. There may be employable various settings available in the device 10 such as the setting for double-sided printing and the setting for marginless printing.

In the illustrated embodiment, where the device 10 cannot initiate printing in the sheet size according to the printing settings when the printing settings are included in the printing command, the device 10 initiates printing in different sheet size in which printing can be initiated. Where the device 10 cannot initiate printing according to the printing settings, the device 10 may transmit, to the service providing server 200 via the relay server 100, printing unfeasible information indicating what settings make printing unfeasible. The service providing server 200 that has received the printing unfeasible information may change the settings that make printing unfeasible to settings that make printing performable by the device 10 and may transmit a new printing command That is, the settings may be changed, and the processings may be re-executed from T1. The device 10 may permit information indicative of printable settings to be included into the printing unfeasible information. Further, the device 10 may permit the printable settings and an inquiry whether printing may be initiated at the settings to be included into the printing unfeasible information. In this instance, where the service providing server 200 that has received the printing unfeasible information transmits, to the device 10 via the relay server 100, the information indicating that printing may be initiated at the printing settings transmitted from the device 10, the device 10 may initiate printing in response to reception of the information. The service providing server 200 that has received the printing unfeasible information may re-execute T1 as described above.

The service providing server 200 may transmit, to the device 10 via the relay server 100, printing reservation information including the printing settings, prior to T1. In this instance, where the device 10 can initiate printing according to the printing settings, the device 10 may transmit, to the service providing server 200 via the relay server 100, printing performable information indicating that printing is performable. Where the device 10 cannot initiate printing, the device 10 may transmit the printing unfeasible information. In this instance, where the service providing server 200 that has received the printing performable information transmits, to the device 10 via the relay server 100, the information indicating that printing may be initiated, the device 10 may initiate printing in response to reception of the information. It is noted that the behavior of the service providing server that has received the printing performable information may be any of the examples described above.

In the illustrated embodiment, when the communication between the device 10 and the relay server 100 is recovered after having been disconnected, the device 10 transmits the abnormal termination notification to the relay server 100. In this respect, the disconnection of the communication between the device 10 and the relay server 100 is not necessarily due to the power source of the device 10, but may be due to separation of communication connectors or due to communication trouble, during performance of the printing operation by the device 10. In view of the above, when the communication between the device 10 and the relay server 100 is recovered, the device 10 may transmit, to the relay server 100, the status of the printing operation performed in the period during which the communication has been disconnected. In this instance, the relay server 100 may update the device information 50 depending upon the status of the printing operation performed in the period during which the communication has been disconnected. In association, the status of the printing operation performed in the period during which the communication has been disconnected can be notified to the service providing server 200.

In the above modified example, when the communication between the device 10 and the relay server 100 is disconnected in the printing operation of FIG. 6A, the device 10 may thereafter retain, for each file on which the printing operation has been performed, the contents of the job report table and the file status stored in the NVRAM 14. When the communication between the device 10 and the relay server 100 is recovered, the device 10 transmits, to the relay server 100, the status information 70 in accordance with the contents stored in the NVRAM 14, for each of all files on which the printing operation has completed after the communication disconnection, in the operation upon restart of FIG. 6B. The relay server 10 updates the contents of the status information 50 to the most recent ones based on the received status information 70. The relay server 100 transmits, to the service providing server 200, the printing status notification to which is attached the updated status information 50. Where the printing operation of a certain file is being performed by the device 10 at timing when the communication between the device 10 and the relay server 100 is recovered, the device 10 transmits, to the relay server 100, the printing completion notification for the file on which printing has completed, as in T8 or T15, in response to completion of the printing operation of the certain file.

A part of the processings in FIG. 6 or FIG. 7 may be omitted or changed without departing from the scope defined in independent claims. For instance, S608, S619, and S620 in FIG. 6 may be omitted.

In the illustrated embodiment, the CPU 11 executes the processings in FIG. 6 and the CPU 101 executes the processings in FIG. 7. A plurality of CPUs may cooperatively execute the processings in FIG. 6 or FIG. 7. Further, IC such as ASIC may execute solely or a plurality of ICs may cooperatively execute the processings in FIG. 6 or FIG. 7. Moreover, the CPU and IC such as ASIC may cooperate with each other to execute the processings in FIG. 6 or FIG. 7.

What is claimed is:

1. An operation performing system, comprising: a device connected to the Internet via a router and capable of performing a certain operation; a service providing server on the Internet configured to provide a service that causes the device to perform the operation; and a relay server having a first storage and configured to relay between the service providing server and the device,
   wherein the device and the relay server are connected in a server-push enabled state in which the relay server transmits information generated on the Internet to the device via the router by use of a communication protocol and the device subsequently receives the information transmitted from the relay server,
   wherein the service providing server is configured to execute a first command-transmission processing for transmitting a performance command that commands performance of the certain operation and that includes specific information for identifying operation information representing the operation to be performed by the device,
   wherein the relay server is configured to execute
      a first reception processing for receiving the performance command transmitted from the service providing server,
      a second command-transmission processing for transmitting, in the server-push enabled state, the received performance command including the specific information to the device by use of the communication protocol, and
      a first storage processing for storing, in the first storage, service identifying information that identifies the service providing server, in response to reception of the performance command transmitted from the service providing server,
   wherein the device is configured to execute processings comprising
      a second reception processing for receiving the performance command transmitted from the relay server in the server-push enabled state,
      an acquiring processing for acquiring the operation information identified by the specific information included in the received performance command,
      an operation performing processing for performing the operation referring to the acquired operation information, and
      a first status-transmission processing for transmitting, to the relay server, status information indicative of a status of the operation that is being performed in the operation performing processing, when timing to transmit the status information comes during performance of the operation, and
   wherein the relay server is configured to execute
      a third reception processing for receiving the status information transmitted from the device,
      a second storage processing for storing in, the first storage, the received status information in association with the service identifying information, and
      a second status-transmission processing for transmitting, to the service providing server that is associated with the status information, the status information stored in the first storage in the second storage processing and not yet transmitted to the service providing server;
   wherein the device has a nonvolatile second storage,
   wherein the device is configured to execute a third storage processing for storing, in the second storage, the status information indicative of the status of the operation that is being performed in the operation performing processing, every time when timing to store the status information in the second storage comes during performance of the operation, and
   wherein, in the first status-transmission processing executed by the device, where not-yet-transmitted status information is stored in the second storage, notification information is transmitted to the relay server, together with the not-yet-transmitted status information, in response to switching of the power source of the device from off to on.

2. The operation performing system according to claim 1, wherein, in the third storage processing executed by the device, in response to completion of performance of the operation in the operation performing processing with respect to one of a plurality of portions included in the operation information, the status information indicative of the number of portions included in the operation information with respect to which the operation has completed is stored in the second storage, and
   wherein, in the first status-transmission processing executed by the device,
      (a) in response to initiation of performance of the operation with respect to the operation information in the operation performing processing, the status information indicative of the initiation is transmitted to the relay server,
      (b) in response to completion of performance of the operation with respect to an entirety of the operation information in the operation performing processing, the status information indicative of the completion is transmitted to the relay server, together with the status information stored in the second storage and indicative of the number of portions included in the operation information with respect to which the operation has completed, and
      (c) where the status information indicative of the number of portions with respect to which the operation has completed is stored in the second storage, the notification information is transmitted to the relay server, in response to switching of the power source of the device from on to off, and
   wherein the device is configured to execute a delete processing for deleting the transmitted status information indicative of the completion.

3. The operation performing system according to claim 2, wherein the performance command is information including a plurality of pieces of the specific information for a plurality of pieces of the operation information and commanding sequential performance of operations respectively referring to the plurality of pieces of the operation information, and
   wherein, in the first status-transmission processing executed by the device, (a) in response to initiation of performance of the operation in the operation performing processing with respect to the operation information identified by one of the plurality of pieces of the specific information included in the performance command, the status information indicative of the initiation is transmitted to the relay server, (b) in response to completion of performance of the operation in the operation performing processing with respect to the operation information identified by the one of the plurality of pieces of the specific information included in the performance command, the status information indicative of the completion is transmitted to the relay server, together with the status information stored in the second storage and indicative of the number of portions included in the operation information with respect to which the operation has completed (c) in response to completion of performance of the operations in the operation performing processing with respect to all of the plurality of pieces of the operation information identified by the respective plurality of pieces of the specific information included in the performance command, the status information indicating that an entirety of the operation commanded by the performance command have been completed is transmitted to the relay server, together with the status information stored in the second storage and indicative of the number of portions included in the operation information with respect to which the operation has completed, and (d) where the status information indicative of the number of portions with respect to which the operation has completed is stored in the second storage, the notification information is transmitted to the relay server, in response to switching of the power source of the device from on to off.

4. The operation performing system according to claim 2, wherein the performance command is information including a plurality of pieces of the specific information for a plurality of pieces of the operation information and commanding sequential performance of printing operations respectively referring to a plurality of pieces of printing information as the plurality of pieces of the operation information, wherein, in the third storage processing executed by the device, in response to completion of printing for one page referring to the printing information, the status information indicative of a cumulative sum of pages for which printing has completed in the printing operation commanded by the performance command is stored in the second storage, and wherein, in the first status-transmission processing executed by the device, (a) in response to initiation of performance of the printing operation in the operation performing processing with respect to the printing information, the status information indicative of the initiation is transmitted to the relay server, (b) in response to completion of performance of the printing operations with respect to all of the plurality of pieces of the printing information identified by the plurality of pieces of the specific information included in the performance command, the status information indicative of the completion is transmitted to the relay server, together with the status information stored in the second storage and indicative of the cumulative sum of pages for which printing has completed in the printing operation commanded by the performance command, and (c) where the status information indicative of the cumulative sum of pages for which printing has completed in the printing operation commanded by the performance command is stored in the second storage, the notification information is transmitted to the relay server, in response to switching of the power source of the device from on to off.

5. The operation performing system according to claim 1, wherein the performance command is information including (1) a plurality of pieces of the specific information for a plurality of pieces of the operation information and (2) entirety identifying information that identifies an entirety of the operation commanded by the performance command, the performance command commanding sequential performance of operations respectively referring to the plurality of pieces of the operation information, wherein the device has the nonvolatile second storage and a volatile third storage, wherein the device is configured to execute a fourth storage processing for storing, in the second storage, the entirety identifying information included in the performance command while storing, in a third storage, the specific information included in the performance command, in response to acquisition of the performance command from the relay server, wherein, in the acquiring processing executed by the device, the operation information identified by the specific information stored in the third storage is acquired, wherein, in the operation performing processing executed by the device, the operation referring to the acquired operation information is performed, wherein, in the second storage processing executed by the device, the status information indicative of the status of the operation that is being performed in the operation performing processing is stored in the second storage in association with the entirety identifying information, every time when timing to store the status information in the second storage comes during performance of the operation, and wherein, in the first status-transmission processing executed by the device, where the not-yet-transmitted status information is stored in the second storage, the notification information is transmitted to the relay server, together with the not-yet-transmitted status information and the entirety identifying information associated with the not-yet-transmitted status information, in response to switching of the power source of the device from off to on.

6. The operation performing system according to claim 1, wherein the performance command includes setting information for the operation commanded by the performance command, wherein, in the third storage processing executed by the device, where the operation in the operation performing processing is performed in settings different from those of the setting information included in the performance command that commands the operation, the status information of the operation that is being performed is stored in the second storage in association with change information indicative of a setting change, every time when timing to store the status information in the second storage comes, and wherein, in the first status-transmission processing executed by the device, where the not-yet-transmitted status information is stored in the second storage, the notification information is transmitted to the relay server, together with the not-yet-transmitted status information and the change information associated with the not-yet-transmitted status information, in response to switching of the power source of the device from off to on.

7. The operation performing system according to claim 1, wherein, in the second status-transmission processing executed by the relay server, a successive transmission processing is executed in which, every time when the status information is stored in the second storage processing, the stored status information is transmitted to the service providing server associated with the status information.

8. The operation performing system according to claim 7,
wherein, in the first command-transmission processing executed by the service providing server, the performance command is transmitted, the performance command including the specific information that identifies the operation information and destination identifying information that identifies a destination of the status information,
wherein, in first storage processing executed by the relay server, the service identifying information that identifies the service providing server and the destination identifying information are stored in the first storage in association with each other, in response to reception of the performance command transmitted from the service providing server, and
wherein, in the second status-transmission processing executed by the relay server, every time when the status information is stored in the second storage processing, the updated status information is transmitted, in the successive transmission processing, referring to the destination identifying information associated with the service identifying information associated with the status information, and the status information is transmitted to the service providing server associated with the status information.

9. The operation performing system according to claim 8,
wherein, in the second command-transmission processing executed by the relay server, in response to reception of the performance command transmitted from the service providing server and storage of the service identifying information that identifies the service providing server, in the first storage, in the first storage processing, the performance command including the service identifying information and the specific information is transmitted to the device according to a server-push technique by use of the communication protocol,
wherein, in the first status-transmission processing executed by the device, in response to reception of the performance command including the service identifying information and the specific information and transmitted from the relay server according to the server-push technique, the status information including the service identifying information is transmitted to the relay server when timing to transmit the status information comes during performance of the operation in the operation performing processing, and
wherein, in the second status-transmission processing executed by the relay server, every time when the status information is stored in the second storage processing, the updated status information is transmitted, in the successive transmission processing, referring to the destination identifying information associated with the service identifying information identified by the service identifying information included in the status information, and the status information is transmitted to the service providing server associated with the status information.

10. An operation performing system, comprising: a device connected to the Internet via a router and capable of performing a certain operation; a service providing server on the Internet configured to provide a service that causes the device to perform the operation; and a relay server having a first storage and configured to relay between the service providing server and the device,
wherein the device and the relay server are connected in a server-push enabled state in which the relay server transmits information generated on the Internet to the device via the router by use of a communication protocol and the device subsequently receives the information transmitted from the relay server,
wherein the service providing server is configured to execute a first command-transmission processing for transmitting a performance command that commands performance of the certain operation and that includes specific information for identifying operation information representing the operation to be performed by the device,
wherein the relay server is configured to execute
a first reception processing for receiving the performance command transmitted from the service providing server,
a second command-transmission processing for transmitting, in the server-push enabled state, the received performance command including the specific information to the device by use of the communication protocol, and
a first storage processing for storing, in the first storage, service identifying information that identifies the service providing server, in response to reception of the performance command transmitted from the service providing server,
wherein the device is configured to execute processings comprising
a second reception processing for receiving the performance command transmitted from the relay server in the server-push enabled state,
an acquiring processing for acquiring the operation information identified by the specific information included in the received performance command,
an operation performing processing for performing the operation referring to the acquired operation information, and
a first status-transmission processing for transmitting, to the relay server, status information indicative of a status of the operation that is being performed in the operation performing processing, when timing to transmit the status information comes during performance of the operation,
wherein the relay server is configured to execute
a third reception processing for receiving the status information transmitted from the device,
a second storage processing for storing in, the first storage, the received status information in association with the service identifying information, and
a second status-transmission processing for transmitting, to the service providing server that is associated with the status information, the status information stored in the first storage in the second storage processing arid not yet transmitted to the service providing server, wherein, in the second status-transmission processing executed by the relay server, a successive transmission processing is executed in which, every time when the status information is stored in the second storage processing, the stored status information is transmitted to the service providing server associated with the status information, wherein, in the second status-transmission processing executed by the relay server, where successive transmission of the status information is requested by the service providing server, the successive transmission processing is executed every time when the status information is stored in the second storage processing, and where the successive transmission of the status information is not requested by the service providing server, the successive transmission processing is not executed even when the status information is stored in the second storage processing, and the status information stored in the first storage is transmitted to the service providing server associated with the status information, in response to reception of request information from the service providing server that requests the status information.

11. An operation performing system, comprising: a device connected to the Internet via a router and capable of performing a certain operation; a service providing server on the Internet configured to provide a service that causes the device to perform the operation; and a relay server having a first storage and configured to relay between the service providing server and the device, wherein the device and the relay server are connected in a server-push enabled state in which the relay server transmits information generated on the Internet to the device via the router by use of a communication protocol and the device subsequently receives the information transmitted from the relay server, wherein the service providing server is configured to execute a first command-transmission processing for transmitting a performance command that commands performance of the certain operation and that includes specific information for identifying operation information representing the operation to be performed by the device, wherein the relay server is configured to execute a first reception processing for receiving the performance command transmitted from the service providing server, a second command-transmission processing for transmitting, in the server-push enabled state, the received performance command including the specific information to the device by use of the communication protocol, and a first storage processing for storing, in the first storage, service identifying information that identifies the service providing server, in response to reception of the performance command transmitted from the service providing server, wherein the device is configured to execute processings comprising a second reception processing for receiving the performance command transmitted from the relay server in the server-push enabled state, an acquiring processing for acquiring the operation information identified by the specific information included in the received performance command, an operation performing processing for performing the operation referring to the acquired operation information, and a first status-transmission processing for transmitting, to the relay server, status information indicative of a status of the operation that is being performed in the operation performing processing, when timing to transmit the status information comes during performance of the operation, wherein the relay server is configured to execute a third reception processing for receiving the status information transmitted from the device, a second storage processing for storing in, the first storage, the received status information in association with the service identifying information, and a second status-transmission processing for transmitting, to the service providing server that is associated with the status information, the status information stored in the first storage in the second storage processing and not yet transmitted to the service providing server, and wherein, in the second status-transmission processing executed by the relay server, where a server-push disabled state continues for more than a predetermined time period between the device and the relay server after the performance command has been transmitted in the second command-transmission processing according to a server-push technique, the status information indicative of an occurrence of an error is transmitted to the service providing server identified by the service identifying information stored in the first storage in the first storage processing.

12. The operation performing system according to claim 11, wherein, in the second status-transmission processing executed by the relay server, where the server-push disabled state continues for more than the predetermined time period between the device and the relay server and the status information received from the device but not yet transmitted to the service providing server is stored in the first storage, the not-yet-transmitted status information and the status information indicative of the occurrence of the error are transmitted.

13. The operation performing system according to claim 11, wherein the device has a nonvolatile second storage, wherein the device is configured to execute a third storage processing for storing, in the second storage, the status information indicative of the status of the operation that is being performed in the operation performing processing, every time when timing to store the status information in the second storage comes during performance of the operation, wherein, in the second status-transmission processing executed by the relay server, where the server-push disabled state continues for more than the predetermined time period between the device and the relay server due to turn-off of a power source of the device after the performance command has been transmitted to the device in the second command-transmission processing according to the server-push technique. the status information indicative of the occurrence of the error is transmitted, wherein, in the first status-transmission processing executed by the device, where not-yet-transmitted status information is stored in the second storage, the notification information is transmitted to the relay server, together with the not-yet-transmitted status information, in response to switching of the power source of the device from off to on, and wherein, in the second status-transmission processing executed by the relay server, where the relay server receives the notification information transmitted from the device after the performance command has been transmitted to the device in the second command-transmission processing according to the server-push technique, the notification information is transmitted to the service providing server identified by the service identifying information stored in the first storage in the first storage processing.

\* \* \* \* \*